United States Patent
Fujii et al.

(10) Patent No.: US 9,734,075 B2
(45) Date of Patent: Aug. 15, 2017

(54) CACHE MEMORY CONTROL PROGRAM, PROCESSOR INCORPORATING CACHE MEMORY, AND CACHE MEMORY CONTROL METHOD

(71) Applicant: FUJITSU LIMITED, Kawasaki-shi, Kanagawa (JP)

(72) Inventors: Masatoshi Fujii, Kawasaki (JP); Hisashi Hinohara, Shinagawa (JP); Yasuhiro Yuba, Kashiwa (JP)

(73) Assignee: FUJITSU LIMITED, Kawasaki (JP)

( * ) Notice: Subject to any disclaimer, the term of this patent is extended or adjusted under 35 U.S.C. 154(b) by 459 days.

(21) Appl. No.: 14/458,424

(22) Filed: Aug. 13, 2014

(65) Prior Publication Data

US 2015/0052314 A1 Feb. 19, 2015

(30) Foreign Application Priority Data

Aug. 13, 2013 (JP) ................. 2013-168069

(51) Int. Cl.
- *G06F 12/08* (2016.01)
- *G06F 12/12* (2016.01)
- *G06F 12/0871* (2016.01)
- *G06F 12/126* (2016.01)

(52) U.S. Cl.
CPC ........ *G06F 12/0871* (2013.01); *G06F 12/126* (2013.01); *G06F 2212/1044* (2013.01); *G06F 2212/601* (2013.01)

(58) Field of Classification Search
CPC ............... G06F 12/0871; G06F 12/126; G06F 2212/1044; G06F 2212/601
See application file for complete search history.

(56) References Cited

U.S. PATENT DOCUMENTS

| 2004/0064819 | A1 | 4/2004 | LaVoie et al. |
| 2004/0250026 | A1* | 12/2004 | Tanoue ................... G06F 3/061 711/151 |
| 2009/0172289 | A1 | 7/2009 | Yamamura et al. |
| 2009/0248922 | A1* | 10/2009 | Hinohara ............ G06F 12/0284 711/170 |

FOREIGN PATENT DOCUMENTS

| JP | 2-18644 | 1/1990 |
| JP | 2002-7213 | 1/2002 |
| JP | 2004-133931 | 4/2004 |
| JP | 2006-4203 | 1/2006 |
| JP | 2009-518754 | 5/2009 |
| JP | 2009-163450 | 7/2009 |
| JP | 2009-211649 | 9/2009 |
| WO | 2007/078587 A1 | 7/2007 |

* cited by examiner

Primary Examiner — Aracelis Ruiz
(74) Attorney, Agent, or Firm — Staas & Halsey LLP

(57) ABSTRACT

A cache memory control procedure has: cache area allocating including allocating, in response to an acquisition request, and according to an effective cache usage degree that is based on a memory access frequency and a difference between a cache hit rate in a case where the dedicated cache area is allocated and a cache hit rate in a case where a shared cache area in the cache memory is allocated, the dedicated cache area for a higher effective cache usage degree and the shared cache area for a lower effective cache usage degree; and releasing the dedicated cache area which is allocated, in response to a release request which is issued during execution of a process by the processor and requests the release of the allocated dedicated cache area.

18 Claims, 30 Drawing Sheets

CACHE MEMORY CONTROL PROGRAM, PROCESSOR INCORPORATING CACHE MEMORY, AND CACHE MEMORY CONTROL METHOD

CROSS-REFERENCE TO RELATED APPLICATION

This application is based upon and claims the benefit of priority of the prior Japanese Patent Application No. 2013-168069, filed on Aug. 13, 2013, the entire contents of which are incorporated herein by reference.

FIELD

The present invention relates to a cache memory control program, a processor incorporating a cache memory, and a cache memory control method.

BACKGROUND

The performance of processors in contemporary server systems has been significantly improved. However, the response of memory access with a CPU is late, and this is a bottleneck to performance improvement. A processor has a cache memory in addition to a CPU. When memory access from the CPU is generated, the cache memory is initially checked, and where a cache hit is determined, the cache memory is accessed. Where a cache miss is determined, the main memory is accessed. The access to the cache memory is 100 times to 300 times faster than that to the main memory. Therefore, in order to improve the performance of memory access with a CPU, it is important to maximize the possibility of cache hits and generate few accesses to the main memory as soon as possible.

A cache hit rate generally rises as the cache size increases. However, where the cache size is comparatively small, the cache hit rate increases significantly with the increase in the cache size, but where the cache size increases to a certain degree; the cache hit rate does not increase anymore despite the increase in the cache size.

Meanwhile, following the transition to multitasking, the processors execute a plurality of processes simultaneously or alternately. For this reason, data on a plurality of processes are stored in the cache memory, an area of the cache memory that has been used by a first process is used by a second process, which is different from the first process, and the data of the first process are pushed out of the cache memory. For this reason, where the first process is thereafter restarted, a cache mishit frequently occurs. Therefore, in the architecture where the same cache memory is shared by all of the processes, it is needed to improve somehow the cache memory control in order to increase the cache hit rate.

The technique of allocating a dedicated cache area to specific processing has been suggested as an example of such improvement. Such technique is described, for example, in the patent documents listed hereinbelow. As a result, the memory process of the specific processing is limited to the dedicated cache area, and therefore the occurrence of cache mishits in a shared cache area is suppressed.

The followings documents relate to the cache memory control program.

Patent Document 1: Japanese Laid-open Patent Publication No. 2004-133931
Patent Document 2: Japanese National Publication of International Patent Application No. 2009-518754
Patent Document 3: Japanese Laid-open Patent Publication No. 2002-7213
Patent Document 4: Japanese Laid-open Patent Publication No. 2006-4203
Patent Document 5: Japanese Laid-open Patent Publication No. 02-18644
Patent Document 6: Japanese Laid-open Patent Publication No. 2009-211649
Patent Document 7: Japanese Laid-open Patent Publication No. 2009-163450

SUMMARY

However, in the abovementioned cache memory control method, the dedicated cache area of the cache memory area is fixedly allocated with respect to specific processing. Further, the cache memory area is fixedly allocated to a shared cache area and a dedicated cache area for a specific application. For this reason, the cache memory area is fixedly divided and allocated in advance, the dedicated cache area is allocated for interruption processing or IO processing with large-volume data, which are not always generated, and the entire cache memory is not used effectively. Further, it is needed to allocate the dedicated cache areas for various types of processing, such as the processing that refers to data only once and the processing for fixedly storing data in the cache memory and allocating a dedicated cache area for each of all those types of processing is wasteful and unrealistic.

Further, the application program needs to describe in advance which dedicated cache area in the cache memory is to be used for each type of processing, and therefore the number of program development steps is increased. In a supercomputer, in which only a specific application program is executed with an ultrahigh speed, a cache hit rate apparently may be increased by fixedly allocating the dedicated cache areas in the cache memory. However, since, in the processor of the aforementioned multitasking server, a variety of application programs need to be executed, and it is difficult to predict which program is to be executed, and a method for fixedly allocating the dedicated cache areas is unrealistic.

One aspect of the embodiment is a non-transitory processor-readable storage medium storing a cache memory control program which causes a processor to execute a procedure, comprising:

cache area allocating including allocating, in response to an acquisition request which is issued during execution of a process by the processor and requests an allocation of a dedicated cache area in a cache memory, and according to an effective cache usage degree that is based on a memory access frequency and a difference between a cache hit rate in a case where the dedicated cache area is allocated and a cache hit rate in a case where a shared cache area in the cache memory is allocated with respect to object processing, which is an object for the acquisition request, the dedicated cache area for a higher effective cache usage degree and the shared cache area for a lower effective cache usage degree; and releasing the dedicated cache area which is allocated, in response to a release request which is issued during execution of a process by the processor and requests the release of the allocated dedicated cache area, and wherein a memory access command that is issued during the object processing to which the dedicated cache area is allocated is executed by the processor by using the dedicated cache area which is allocated.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

The table of contents of the present embodiment is presented below.

[First Embodiment]
  [Outline of Dynamic Allocation of Cache Area of Present Embodiment]
    [Allocation S15, S16 of Dedicated Cache Area for Dedicated Area Acquisition Request]
    [Memory Access S13 Using Dedicated Cache Area]
    [Release of Dedicated Cache Area for Dedicated Area Release Request]
  [Detailed Description of Dynamic Allocation Processing of Cache Area in Present Embodiment]
    [Indicators of Allocation Determination of Cache Area]
      [Effective Number of cache hits]
      [Locality of Memory Access]
      [Effective Cache Usage Degree, Priority-added Effective Cache Usage Degree, Cache Disturbance Force]
    [Dedicated Area Acquisition Request Determination Processing S16 (1)]
    [Dedicated Area Acquisition Request Determination Processing S16 (2)]
    [Periodical Allocation Review Processing S18]
      [Periodical Allocation Review Processing S18 (1)]
      [Periodical Allocation Review Processing S18 (2)]
      [Periodical Allocation Review Processing S18 (3)]
    [Replacement Processing of Sector ID Conversion Table During Process Switching]
[Second Embodiment]

The embodiments will be explained hereinbelow according to the abovementioned table of contents.

First Embodiment

Figure 1:
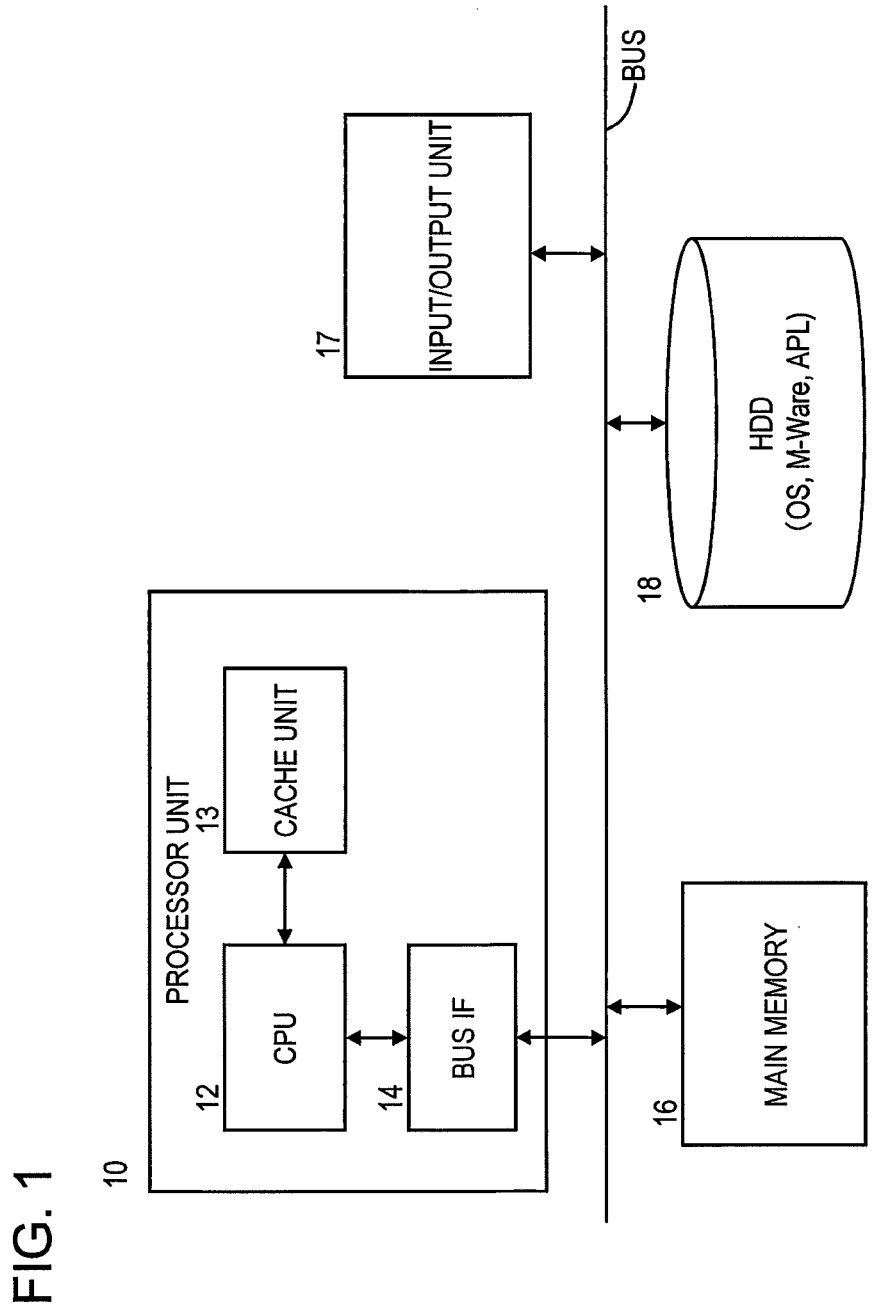
FIG. 1 is a configuration diagram of a server in the present embodiment.

FIG. 1 is a configuration diagram of a server in the present embodiment. The server has a processor unit 10, a main memory 16, an input/output unit 17 such as a keyboard and a display device, and a large-capacity storage 18 such as a hard disk. The processor unit 10 has a CPU 12 executing machine language commands, a cache unit 13 having a cache memory and a cache memory control unit, and a bus interface 14 for controlling the access from the CPU to the main memory 16.

The storage 18 stores an operation system (OS), middleware (M-Ware) such as a compiler, and an application program (APL). Those programs are loaded into the main memory 16 when the server is started and then executed by the CPU 12. The main memory 16 also stores data needed for executing the processes included in the application program APL. The access rate to the main memory 16 by the CPU 12 is much lower than that to the cache memory.

Meanwhile, the capacity of the cache memory is much less than that of the main memory 16.

Figure 2:
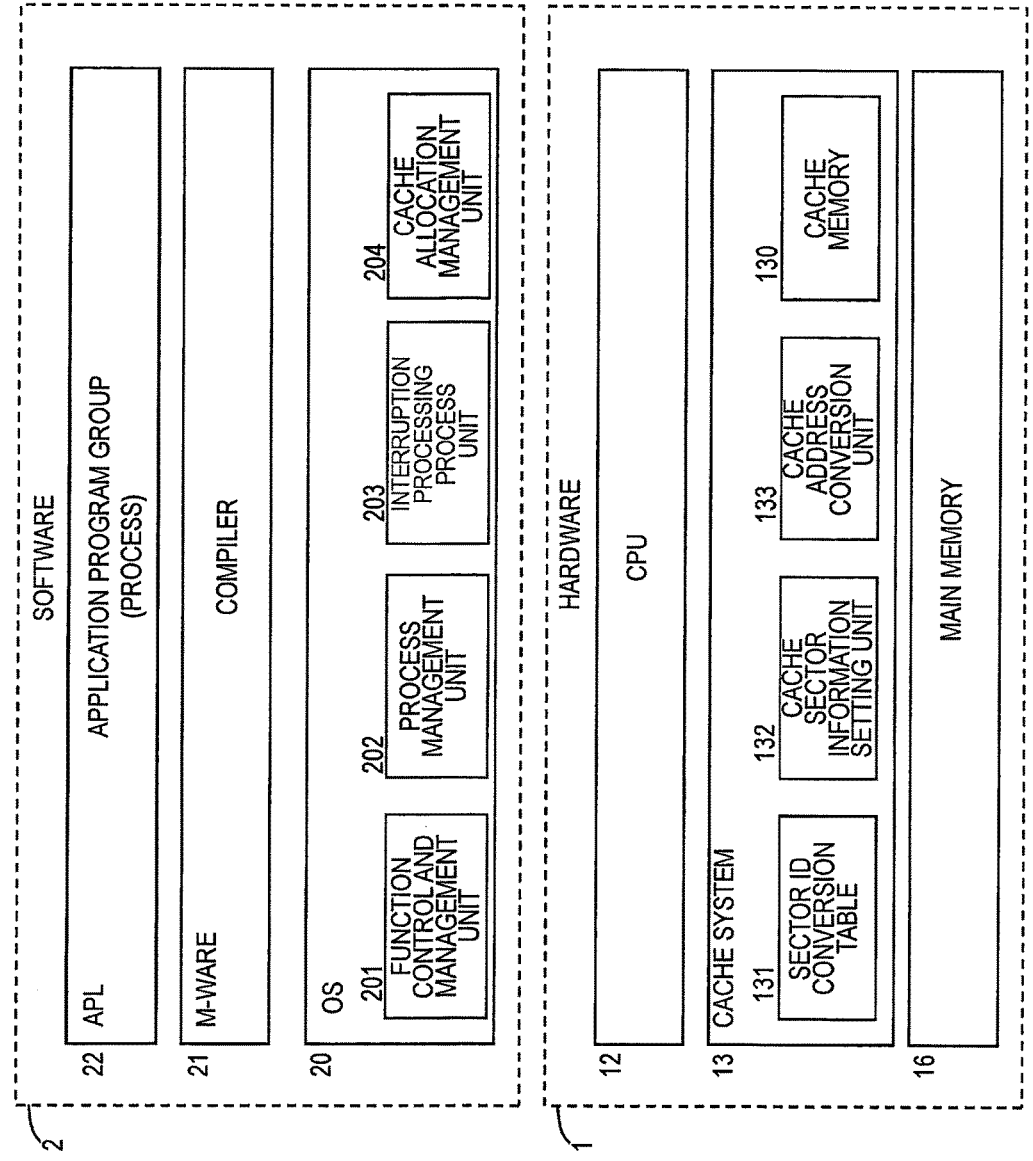
FIG. 2 is a configuration diagram of server hardware and software in the present embodiment.

FIG. 2 is a configuration diagram of server hardware and software in the present embodiment. Hardware 1 has the configuration depicted in FIG. 1. FIG. 2 depicts, in particular, the main memory 16, the cache system 13, and the CPU 12.

The cache system 13 has a cache memory 130 configured of a high-speed semiconductor memory such as an SRAM, a sector ID conversion table 131 which is referred to when the cache memory 130 is accessed, a cache sector information setting unit 132 where size setting of a dedicated cache area is performed, and a cache address conversion unit 133 which is used when the cache memory is accessed.

In the present embodiment, the CPU 12 executes machine language commands having a local sector ID attached thereto, in addition to the usual machine language commands. As described hereinbelow, the local sector ID is used to identify the area of the cache memory used by the machine language command.

Where cache memory areas (cache sectors) are dynamically allocated to various processes of the application program, the OS 20 associates the ID of the cache sector which is to be allocated with a local sector ID in the sector ID conversion table 131. The sector ID conversion table 131 is referred to when the cache memory is accessed, and the local sector ID added to the machine language command is converted into a cache sector ID indicating the usage area in the cache memory. With such a method, the OS 20 dynamically allocates the dedicated cache area to various processes of the program or processing within the processes, and uses the allocated dedicated cache area for the processes or processing within the processes.

The cache sector information setting unit 132 in the cache system 13 sets a cache size which is to be allocated to a cache memory area (cache sector). As described hereinbelow, when a dedicated cache area is allocated, the OS 20 sets the cache size thereof in the cache sector information setting unit 132. The cache address conversion unit 133 converts the address of memory access with the CPU 12 to the cache memory address.

The software 2 depicted in FIG. 2 has the operation system (OS) 20, the middleware 21 such as a compiler that converts an application program into a machine language, and an application program group 22 having a plurality of application programs.

A function control and management unit 201 in the OS manages a function invoked in each process of the application program. Typically, where a function is invoked, the function control and management unit 201 manages the data used by the function as stack data, and where the function is read back, the unit releases the stack data.

The OS 20 executes the processing of each process while switching multiple tasks (or multiple processes). A process management unit 202 performs switching control of the processes. In particular, in the present embodiment, the process management unit 202 switches the sector ID conversion table 131 in the cache system 13 each time the process is switched. As a result, dynamic allocation of an adequate cache area is performed correspondingly to each process. This will be described below in greater detail.

An interruption processing process 203 is an OS interruption processing program executed when an IO interruption or an exceptional interruption from an internal program has occurred. A dedicated area acquisition request and a dedicated area release request are included in the interruption processing process. This will be described below in greater detail.

In the present embodiment, the OS 12 executes dynamically the allocation, for example, of a shared cache area, a dedicated cache area, and a disturbance processing cache area in the cache memory in response to the dedicated area acquisition request issued in the process of the application program. This dynamic allocation is performed on the basis of the characteristic of memory access of an object processing corresponding to the dedicated area acquisition request (referred to hereinbelow as "corresponding processing"), or the access state of the cache memory during the dedicated area acquisition request. A cache allocation management unit 204 controls the dynamic allocation of the cache areas.

The abovementioned shared cache area (or shared area) is an area of the cache memory that is commonly used by a plurality of processes or corresponding processing, and where the shared cache area is used by a certain process or corresponding processing, data stored in the shared cache area are sometimes evicted by the other process or corresponding processing.

Meanwhile, the dedicated cache area (or dedicated area) is an area of the cache memory that is allocated to a certain dedicated area acquisition request, and the memory access in the object processing of the dedicated area acquisition request uses the dedicated cache area allocated thereto. Therefore, the data in the dedicated cache area are not evicted by the memory access of another process or corresponding processing, and the data of the shared cache area or another dedicated cache area are also not evicted by the access to the dedicated cache area.

The disturbance processing cache area as referred to herein is an area of the cache memory that is allocated to the dedicated area acquisition request relating to the corresponding processing with a significantly high cache mishit rate of the corresponding processing. The disturbance processing cache area is a kind of a dedicated cache area. The cache control in the disturbance processing cache area is performed isolated from the shared cache area or another dedicated cache area. Therefore, it is avoided that the data in the shared cache area or another dedicated cache area are evicted due to a high cache mishit rate of the corresponding processing to which the disturbance processing cache area has been allocated, and subsequently cache mishit rate increases. The disturbance processing cache area is sometimes allocated to a plurality of dedicated area acquisition requests. Where the disturbance processing cache area is provided, the eviction of the data of the shared cache area or another dedicated cache area due to a high cache mishit rate caused by the disturbance processing is suppressed and a significant decrease in the cache hit rate is suppressed.

The processing steps executed by the cache allocation management unit 204, for example, includes the following steps. Firstly, a characteristic examination step for performing the examination of memory access properties, such as a memory access frequency and a cache hit rate when the dedicated cache area has been allocated, with respect to the process or the object processing, which is the object for the dedicated area acquisition requests, under the development environment; secondly, a step for replacing the sector ID conversion table 131 in the cache system 13 at the time of process switching; thirdly, a cache area replacement determination step between the shared cache area, dedicated cache area, and disturbance processing cache area; and fourthly, an updating step for updating the sector ID conversion table on the basis of the cache area replacement determination result and for size setting for the allocation cache area of the cache sector information setting unit 132.

The compiler of the middleware 21 converts the application program described with a source code into a machine language (object code) in an executable format. In addition to typical compile processing, the compiler adds a machine language command of a dedicated area acquisition request, which is issued, as appropriate, in each process and requests the allocation of the dedicated cache area, and a machine language command of a dedicated area release requests for releasing the dedicated area that has been allocated. The compiler also assigns a local sector ID, which is unique in the process, to each dedicated area acquisition request which is to be issued. The compiler also assigns the local sector ID to the machine language command that uses the acquired dedicated cache area. As a result, the dedicated cache area is dynamically allocated in the cache area, which is to be used in the object processing, with respect to the dedicated area acquisition request, and the entire cache memory area is effectively used. Thus, the below-described effective cache usage degree and priority-added effective cache usage degree is increased.

The application program (APL) 22 is compiled in the machine language which is the executable format of the application program. As a result, the CPU 12 executes the machine language of the application program.

[Outline of Dynamic Allocation of Cache Area of Present Embodiment]

Figure 3:
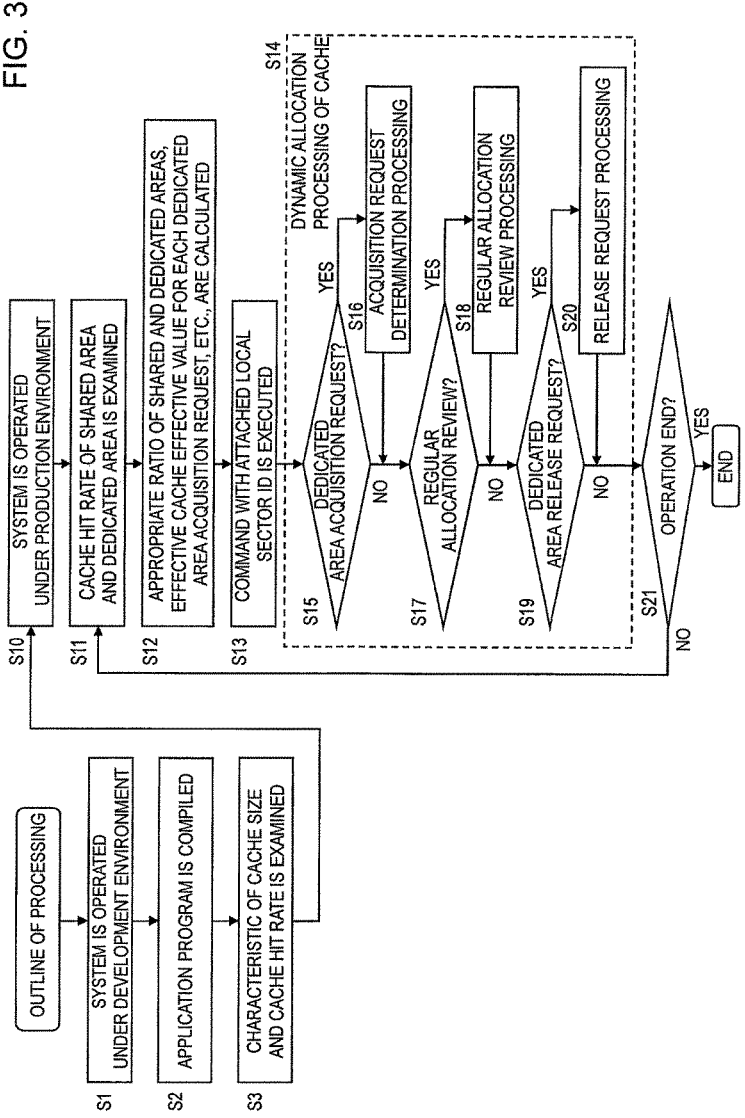
FIG. 3 is a flowchart outlining the dynamic allocation of a cache area in the present embodiment.

FIG. 3 is a flowchart outlining the dynamic allocation of a cache area in the present embodiment. Initially, the system is caused to operate under the development environment in which the application program APL has been installed in the server (S1). First, the compiler is executed in the processor (CPU), and the application program APL is compiled (S2). A portion relating to the dynamic allocation of the cache area in the compiling step S2 is described below.

Figure 4:
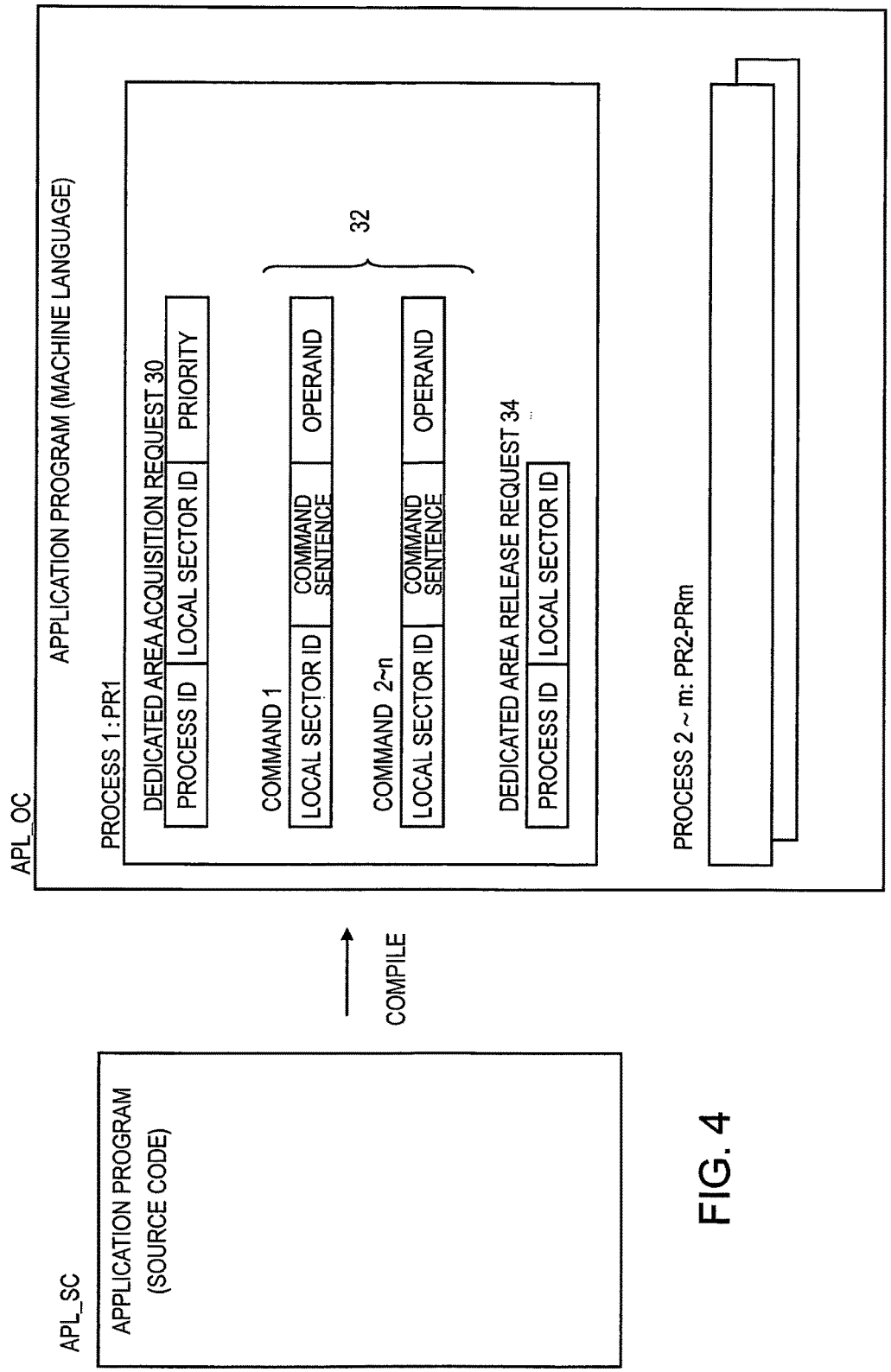
FIG. 4 depicts the processing in which the compiler 21 compiles the source code of the application program into a machine language.

FIG. 4 depicts the processing in which the compiler 21 compiles the source code of the application program into a machine language. The compiler converts the source code APL_SC of the application program into the machine language (object code) APL_OC which is the executable format thereof. A typical compiler function is to convert a source code into a command of a machine language having a command section and an operand.

In the present embodiment, the compiler further, inserts, as appropriate, the dedicated area acquisition request 30, which requests the allocation to the dedicated cache area of the cache memory, and the dedicated area release request 34 corresponding thereto into a plurality of processes in the application program. For example, as depicted in FIG. 4, the dedicated area acquisition request 30 is a machine language command having a process ID, a local sector ID, and a priority of the object processing of the dedicated area acquisition request 30. The dedicated area acquisition request 30 is issued and the allocation of the dedicated cache area is requested in the OS 20, in a portion which is demanded to be processed with occupying cache area in each process.

The process ID is identification information of an operation process PR1 managed by the OS 20. The local sector ID is local identification information in the process PR1 for identifying the object processing 32 of the dedicated area acquisition request 30. This identification information specifies the allocated dedicated cache area.

The priority is a value indicating the priority of the object processing 32. This value is represented, for example, in 8 stages, from 0 to 7. However, since the processing inside the OS needs to be prioritized, a restriction is imposed such that only a priority, for example, from 0 to 5 is allocated to the user program.

Meanwhile, the dedicated area release request 34 has a process ID and a local sector ID same as those of the dedicated area acquisition request 30 forming a pair therewith. As a result, the dedicated cache area allocated by the OS 20 is released and a shared cache area is allocated instead thereof to the object processing.

The compiler then generates a command assigned with a local sector ID by adding a local sector ID to a command between the dedicated area acquisition request 30 and the dedicated area release request 34, the local sector ID identifying the dedicated cache area that is to be used by this command. Therefore, the command in the object processing 32, which is the object for the dedicated area acquisition request, executes the memory access by using the allocated dedicated cache area on the basis of the local sector ID. However, all of the commands between the dedicated area acquisition request 30 and the dedicated area release request 34 are not needed to use the dedicated cache area. In such a command, by designating the local sector ID, for example, as "0", it is possible to execute the memory access by using a shared cache area, rather than the dedicated cache area, in the same manner as in the usual command.

A plurality of the abovementioned dedicated area acquisition requests 30 may be issued in the process PR1. Each dedicated area release request 34 corresponding to the dedicated area acquisition request 30 is issued at a position suitable for releasing the dedicated area.

Returning to FIG. 3, the characteristic examination of the dedicated area acquisition request is executed under the development environment (S3). In the present embodiment, a partial area in the cache memory is dynamically allocated as a dedicated cache area to a specific process or to partial processing in the process. The objective of such dynamic allocation is to increase the total number of cache hits per unit time in the cache memory and minimize the number of cache mishits by adequately allocating the dedicated cache area. Therefore, information is needed for determining whether or not the dedicated cache area is to be allocated in response to the dedicated area acquisition request.

Processing of various types can be the object for the dedicated area acquisition request of each process. Examples thereof are listed below.

"The entire process is the object processing of the dedicated area acquisition request, and the dedicated cache area, which is to be used in the entire process, is requested".

"The object processing of the dedicated area acquisition request is partial processing in a process".

"The object processing of the dedicated area acquisition request is to access a wide range of the memory and evict and disturb data in the cache area".

"The object processing of the dedicated area acquisition request is to store data fixedly in the cache area and generate practically no cache mishits".

"The object processing ends over an ultra-short period of time".

"The cache hit ratio in the object processing differs significantly between when the dedicated cache area is used and when the shared cache area is used".

By examining those types of processing in advance, it is possible to determine adequately as to whether or not the dedicated cache area is to be allocated to the dedicated area acquisition request during the production operation.

Accordingly, in step S3, characteristic examination is executed in order to examine the degree to which the cache hit ratio is to be increased when the allocation of the dedicated cache area to the dedicated area acquisition request in the application program in the machine language compiled under the development environment is allowed. More specifically, the dedicated cache area is allocated only to the dedicated area acquisition request which is the characteristic examination object, and (1) the number of memory access cycles (memory access frequency) per unit time, and (2) the cache hit rate in the dedicated cache area are acquired while gradually increasing the size of the dedicated cache area from 0.

Figure 5:
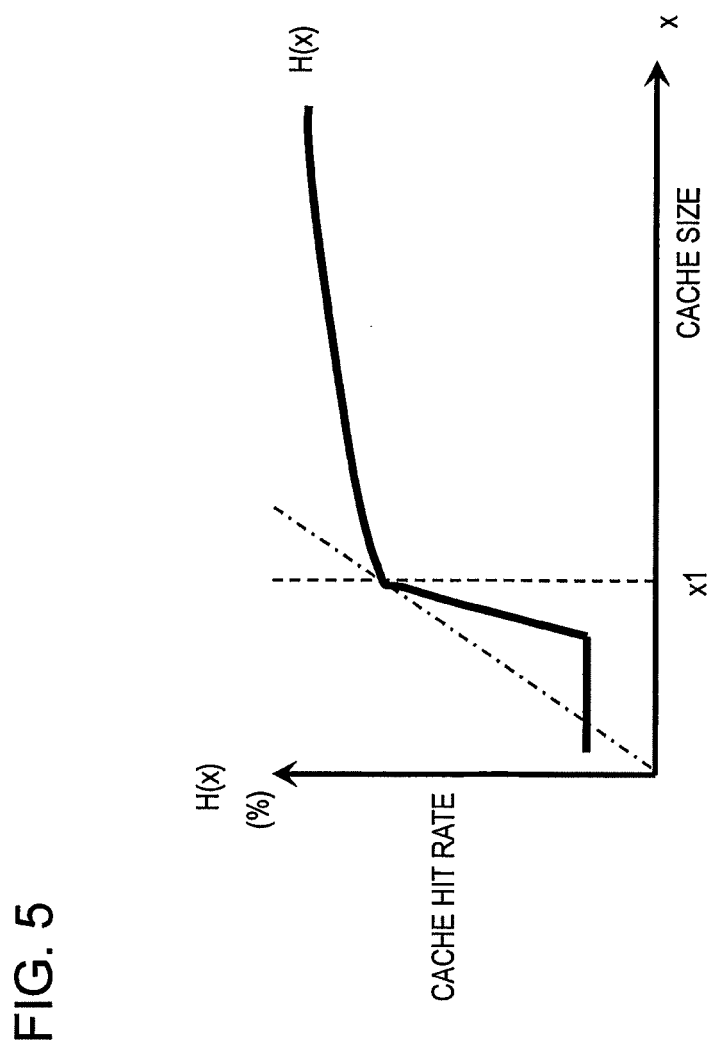
FIG. 5 depicts a characteristic example of the cache hit rate versus the cache size obtained in the abovementioned characteristic examination.

FIG. 5 depicts a characteristic example of the cache hit rate versus the cache size obtained in the abovementioned characteristic examination. The cache hit rate H(x) at each cache size in the case in which the cache size x plotted on the abscissa increases from 0 is plotted against the ordinate. The characteristic of the cache hit rate versus the cache size is typically such that in a range of small cache sizes, the increase in the case size does not contribute that much to the increase in the cache hit rate, but in a certain cache size range, the cache hit rate rises rapidly as the cache size increases, and then at a size larger than a certain cache size, the increase in the cache hit rate becomes less significant.

Therefore, a cache size x1 at a point in which a straight line (dot-dash line) extending from the point of origin in FIG. 5 comes into contact with the cache hit rate characteristic H(x) becomes a reference point in which the increase in the cache size makes the largest contribution to the increase in the cache hit rate.

At the stage of examining the cache hit rate, which is depicted in FIG. 5, the number of memory access cycles (memory access frequency), the number of cache hits, and the number of cache mishits per unit time are acquired at the same time.

Figure 20:
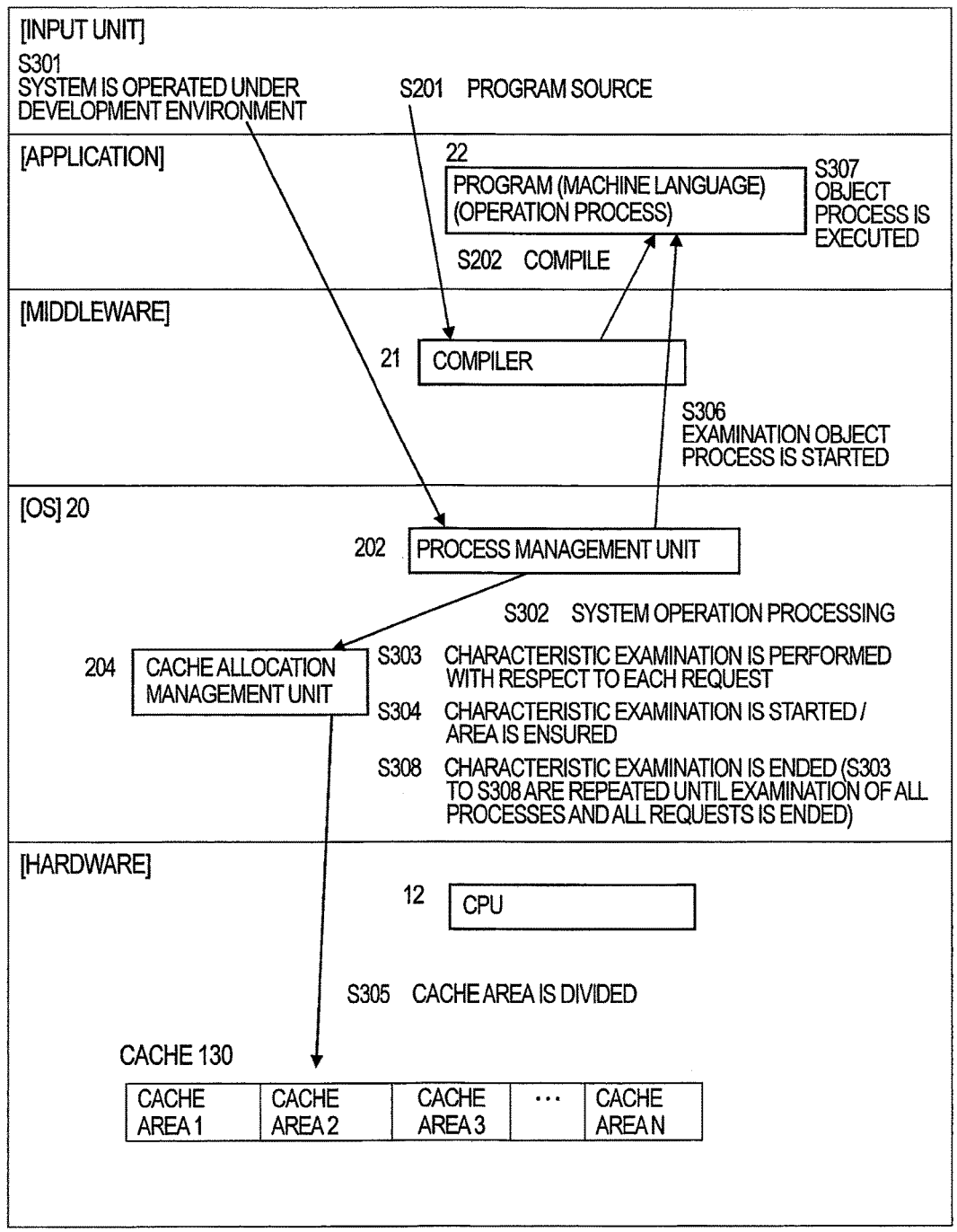
FIG. 20 depicts the processing performed in the server system in steps S2 and S3 depicted in FIG. 3.
Figure 21:
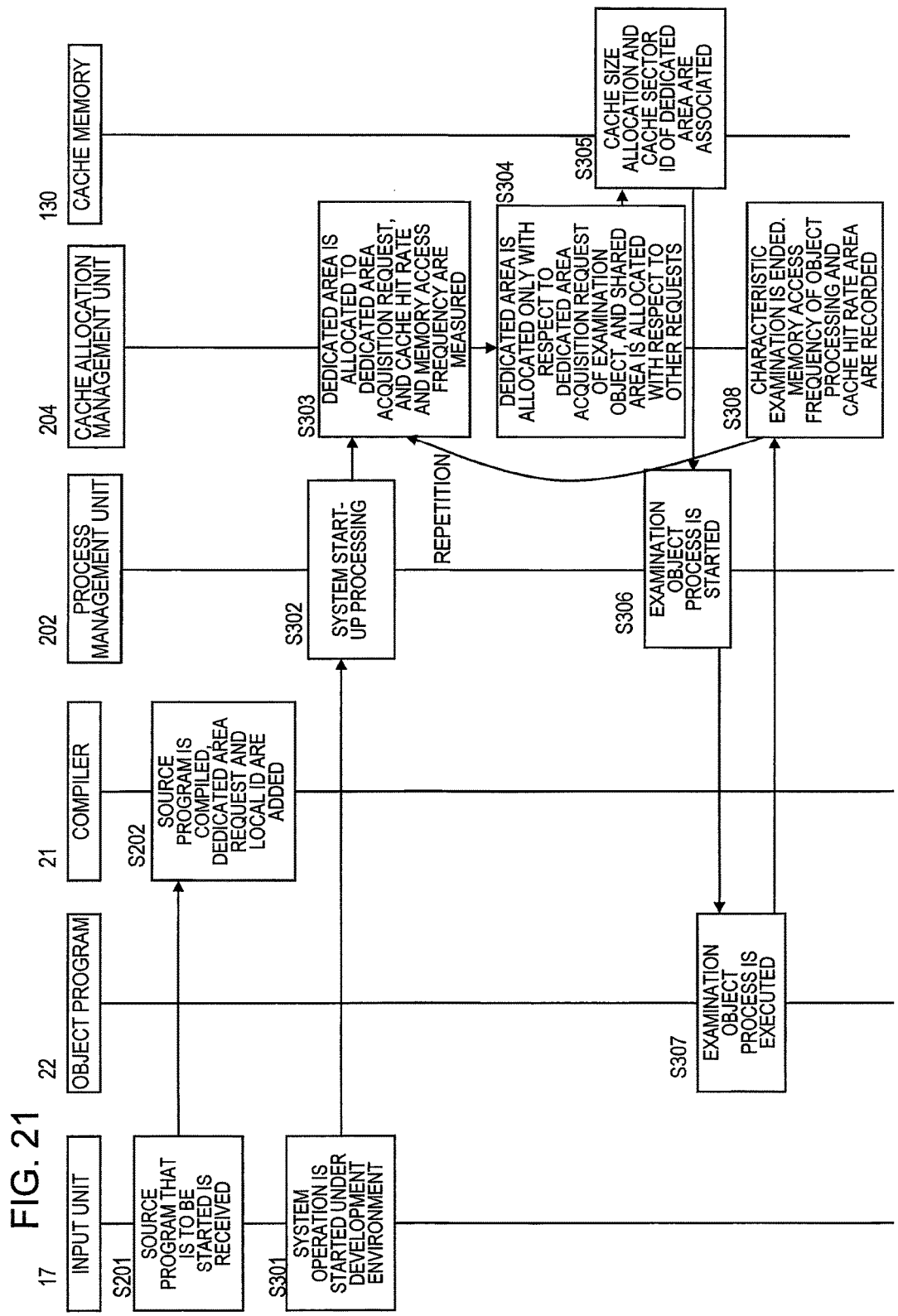
FIG. 21 is a flowchart corresponding to the processing in the server system depicted in FIG. 20.

FIG. 20 depicts the processing performed in the server system in steps S2 and S3 depicted in FIG. 3. FIG. 21 is a flowchart corresponding to the processing in the server system depicted in FIG. 20. The processing of steps S2 and S3 depicted in FIG. 3 is explained below with reference to those figures.

Initially, the source code of the application program is inputted from the input unit of the server system (S201). Then, the compiler 21 compiles the source code of the application program and converts it into an object code (machine language) (S202). The conversion to the machine language command has been explained with reference to FIG. 4.

The system operation is then started from the input unit of the server system under the development environment (S301). In response thereto, the process management unit 202 in the OS 20 implements the process start-up processing and performs the system operation processing (S302).

In the process operation under the development environment, the cache allocation management unit 204 in the OS 20 allows a request with respect to each dedicated area acquisition request contained in the application program which is the characteristic examination object, executes the command while using the dedicated cache area, which has been allocated, and measures the memory access frequency and cache hit rate. In this case, the cache allocation management unit 204 measures the memory access frequency and cache hit rate at each size while changing the size of the dedicated cache area from 0 to the maximum value (S303). The characteristic graph depicted in FIG. 5 is thus produced.

When the characteristic examination is started, the cache allocation management unit 204 reads the sector ID conversion table 131 of the process corresponding to the dedicated area acquisition request which is the characteristic examination object, associates the cache sector ID of the dedicated cache area, which is to be allocated, with the local sector ID of the examination object, and allocates the size that has been set for this dedicated cache area (S304). The cache sector ID=0, which indicates the shared cache area, is associated with the local sector ID corresponding to the dedicated area acquisition request other than the examination object. As a result, the dedicated cache area of a size designated only with respect to the local sector ID of the processing which is the examination object is generated in the cache memory 130 (S305).

When the preparation for the start of the characteristic examination is completed, the process management unit 202 starts the examination object process (S306), and the examination object process in the application program 22 is executed (S307). During the execution of the examination object process, memory access is executed using the dedicated cache area which has been allocated.

The processing of step S303 to S307 is repeatedly executed until the characteristic examination of all of the dedicated area acquisition requests of all of the processes is completed. Where the examination is completed, the cache allocation management unit 204 records the memory access frequency and cache hit rate of the examination object process and ends the characteristic examination (S308).

Returning to FIG. 3, where the system is operated under the production environment (S10), the following processing is executed. The OS 12 examines in the background the cache hit rate of the shared cache area and the dedicated cache area which has been acquired with the dedicated area acquisition request (S11). In this examination, the memory access frequency of the shared cache area and the dedicated cache area is also acquired. More specifically, the examination is performed using the counter of an access function to each area and the counter of the number of cache hits.

On the basis of the examination results, the OS 20 calculates a suitable ratio of the shared cache area and the dedicated cache area, or the priority-added effective cache usage degree for each dedicated area acquisition request. The suitable ratio of the shared cache area and the dedicated cache area is calculated by the ratio of memory access numbers to both areas (this will be described hereinbelow in detail). The priority-added effective cache usage degree is determined by multiplying the difference in the cache hit rate between the case in which the dedicated cache area is used and the case in which the shared cache area is used by the memory access frequency and then further multiplying by the priority. This will be described below in greater detail.

The CPU 12 then executes the command assigned with the local sector ID, which has been explained in FIG. 4 (S13). The execution of this command is explained hereinbelow in greater detail.

The OS 20 then performs the dynamic allocation processing of the cache area (S14). In the dynamic allocation processing of an area in the cache memory, firstly, when a dedicated area acquisition request is issued (S15), the cache allocation management unit 204 in the OS 20 performs the processing of determining whether or not the dedicated cache area is to be allocated to the dedicated area acquisition request, and allocates the dedicated cache area, or the shared cache area, or the disturbance processing cache area (S16).

Secondly, at a regular allocation review timing (S17), the cache allocation management unit 204 in the OS 20 executes the regular allocation review processing (S18). The regular allocation review processing includes: (1) the processing of determining whether or not the allocated dedicated cache area of the allocated dedicated area acquisition request and the non-allocated dedicated cache area which is requested by the non-allocated dedicated area acquisition request are to be replaced; (2) the processing of determining whether or not part of the shared cache area is to be allocated as a dedicated cache area to the non-allocated dedicated area acquisition request; and (3) the processing of determining whether or not the allocated dedicated cache area is to be released and changed into the shared cache area, this being the processing inverted with respect to aforementioned processing. In the regular allocation review processing S18, the cache allocation management unit 204 performs the replacement of the dedicated cache area, or the allocation or release of the dedicated cache area correspondingly to the determination result.

Thirdly, when the dedicated area release request has been issued (S19), the cache allocation management unit 204 performs the release request processing of releasing the requested dedicated cache area and making it part of the shared cache area (S20).

The abovementioned steps S11 to S20 are repeated until the system operation is ended.

Figure 6:
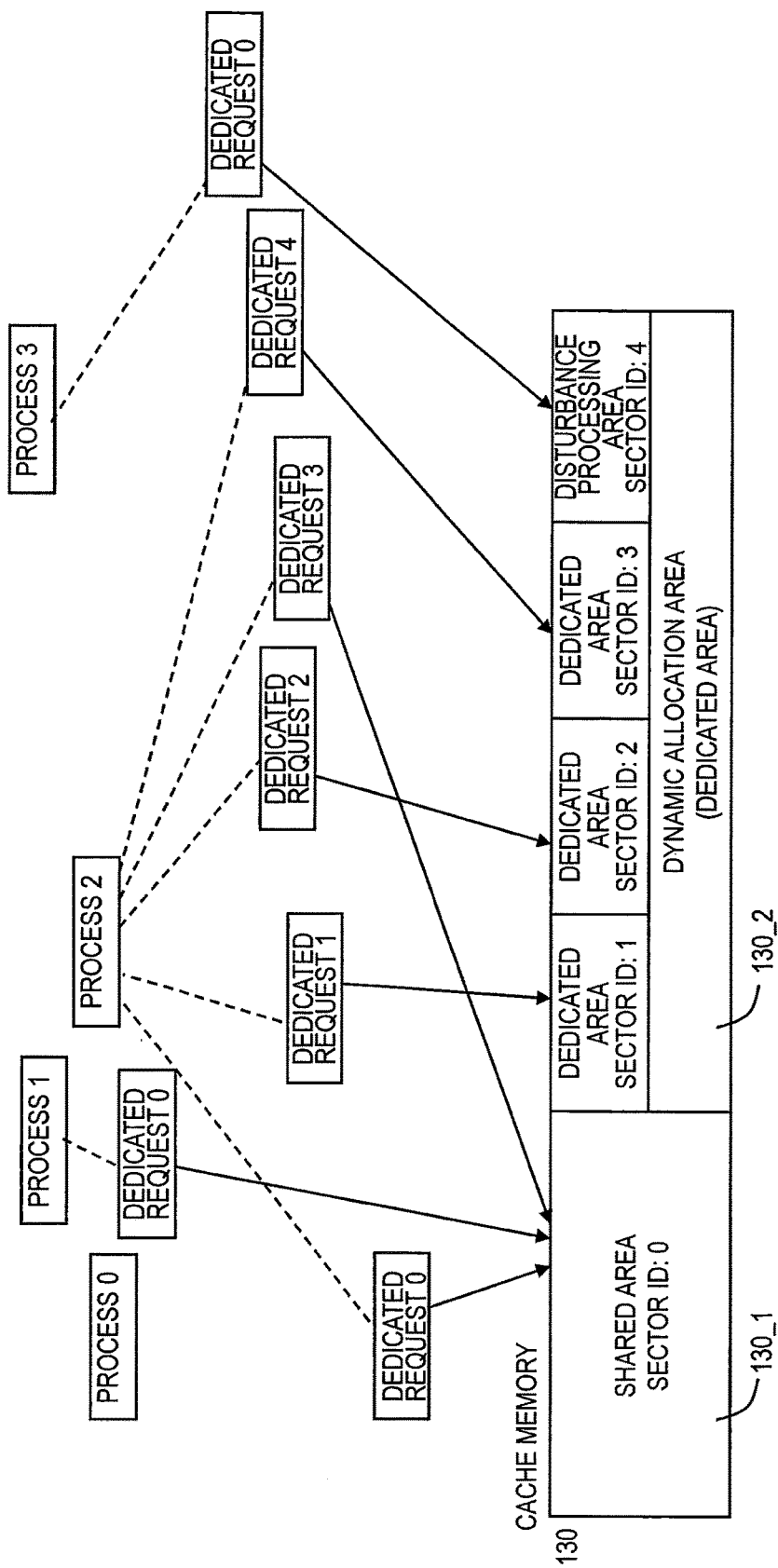
FIG. 6 depicts the configuration of the cache area and the allocation in response to the dedicated area acquisition request.

FIG. 6 depicts the configuration of the cache area and the allocation in response to the dedicated area acquisition request. The cache memory 130 has a shared cache area 130_1 and a dedicated cache area 130_2, which is a dynamic allocation area. The dedicated cache area 130_2 includes a plurality of dedicated cache areas and a disturbance processing cache area which are allocated to the dedicated area acquisition request. In other words, the disturbance processing cache area is a kind of a dedicated cache area.

The cache memory 130 is sector-divided into the shared cache area and dedicated cache areas, and the areas are sequentially assigned with sector ID starting from 0. The shared cache area has the sector ID=0. The shared cache area is a cache area that is shared by a plurality of processes or object processing operations in the process. Meanwhile, the dedicated cache area is a cache area that has a size, which is allowed by the determination, and is occupied and used exclusively by the object process of the allocated dedicated area acquisition request. The disturbance processing cache area, which is a kind of the dedicated cache area, is allocated when the memory access of the object processing of the dedicated area acquisition request is performed with respect to a wide-range address, other data in a shared cache area are evicted and disturbed if allocated to the shared cache area. Therefore, in some cases, the disturbance processing cache area is allocated to a plurality of dedicated area acquisition requests.

As mentioned hereinabove, the dedicated area acquisition request is issued for each process in the application program APL or for each object processing in the process, and the dedicated cache area is allocated to the dedicated area acquisition request according to the determination result. Therefore, the dedicated cache area is not necessarily allocated, and in some cases the shared cache area is allocated and waits for the allocation of the dedicated cache area while the dedicated area acquisition request becomes a non-allocated dedicated area acquisition request. This is because the size and the possible number of divisions in the cache memory 130 are limited from above.

In the example depicted in FIG. 6, the shared cache area 130_1 is allocated, based on the determination result, to the dedicated area acquisition request 0 of the process 1 and the dedicated area acquisition requests 0 and 3 of the process 2. The sector ID=1, 2, and 3, which are the dedicated cache areas, are allocated to the dedicated area acquisition requests 1, 2 and 4, respectively, of the process 2. The sector ID=4, which is a disturbance processing cache area, is allocated, based on the determination result, to the dedicated area acquisition request 0 of the process 3.

Figure 22:
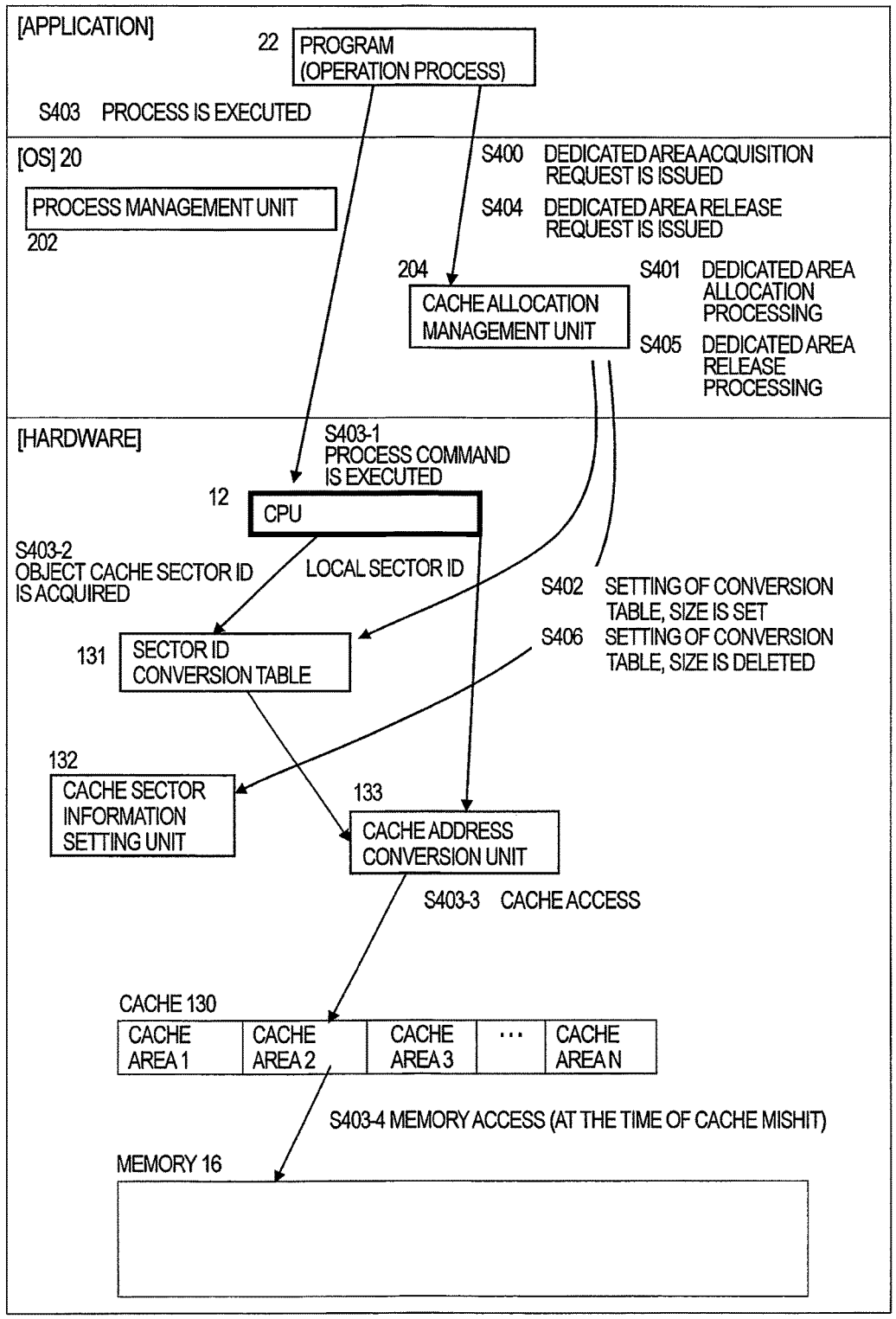
FIG. 22 illustrates the processing in the server system in steps S13, S16, and S19 depicted in FIG. 3.
Figure 23:
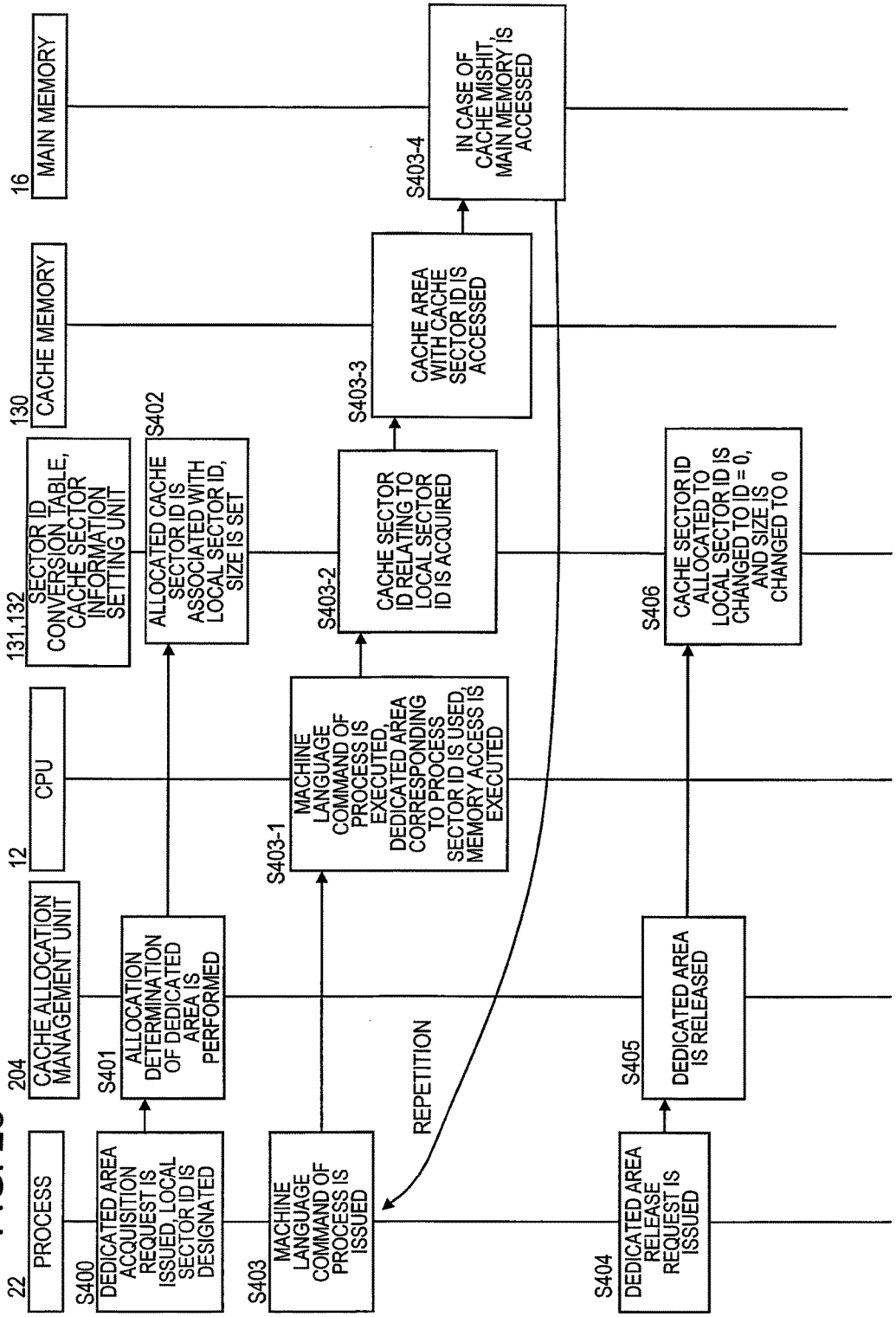
FIG. 23 is a flowchart corresponding to the processing in the server system illustrated by FIG. 22.

FIG. 22 illustrates the processing in the server system in steps S13, S16, and S20 depicted in FIG. 3. FIG. 23 is a flowchart corresponding to the processing in the server system illustrated by FIG. 22. The allocation of the dedicated cache area in response to the dedicated area acquisition request, the memory access using the dedicated cache area, and the release of the dedicated cache area in response to the dedicated area release request are explained hereinbelow with reference to those drawings.

[Allocation S15 and S16 of Dedicated Cache Area in Response to Dedicated Area Acquisition Request]

Initially, a dedicated area acquisition request is issued in the process of the application program 22 (S400). A local sector ID is attached to the dedicated area acquisition request. In response to this request, the cache allocation management unit 204 in the OS 20 executes the determination as to whether or not the allocation of a dedicated cache area is allowed (S401). This determination processing is explained below. Where the allocation is allowed, the cache allocation management unit 204 sets the cache size of the dedicated cache area, which is to be allocated, in the cache sector information setting unit 132 and also sets the sector ID of the allocated area in the column of the cache sector ID corresponding to the local sector ID in the sector ID conversion table 131 in the cache system 13 (S402).

Figure 7:
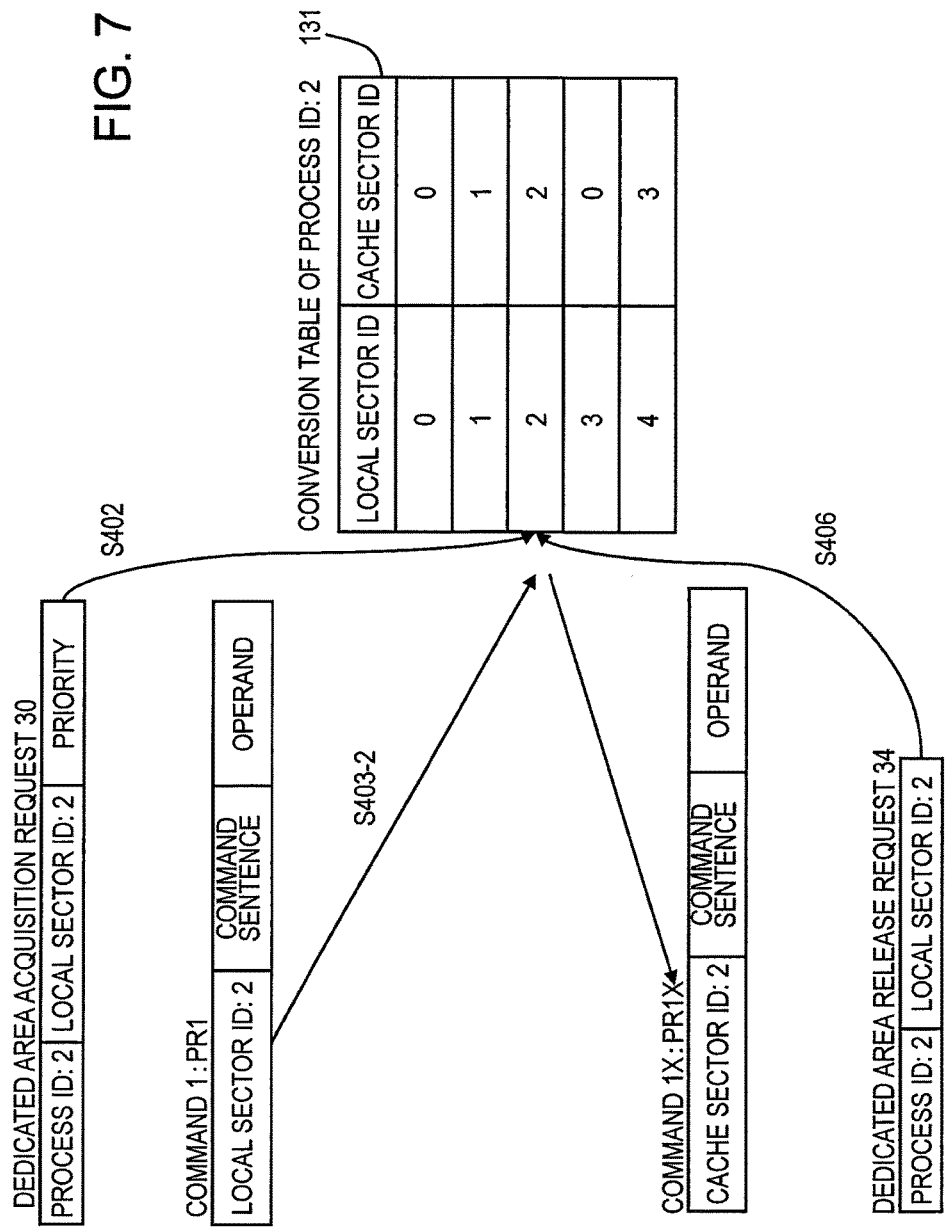
FIG. 7 depicts an example of the conversion table.

FIG. 7 depicts an example of the conversion table. In FIG. 7, the sector ID of the dedicated cache area with the cache sector ID=2 is entered as the local sector ID=2 in the conversion table 131 of the process ID=2 with respect to the dedicated area acquisition request 30 with the process ID=2 and the local sector ID=2.

[Memory Access S13 Using Dedicated Cache Area]

When the process of the application program 22 is executed, a command (machine language command) with an attached local sector ID that identifies the dedicated cache area which is to be used is executed (S403). Further, the CPU 12 interprets and executes this command with the attached local sector ID (S403-1). During this execution, the CPU 12 acquires the cache sector ID corresponding to the local sector ID by referring to the sector ID conversion table 131 (S403-2). Thus, this acquisition is performed as represented by S403-2 in FIG. 7.

Then, the cache address conversion unit 133 converts the memory access address into an address in the cache memory and performs cache access to the dedicated cache area with the cache sector ID=2 in the cache memory 130 (S403-3). In this case, where a cache mishit is generated, the main memory 16 is accessed via a bus interface 14 (S403-4). In the case of a cache hit, data in the dedicated cache area are read or data are written to the dedicated cache area.

As mentioned hereinabove, when a dedicated cache area is allocated, a command in a process accesses the memory by using the allocated dedicated cache area.

[Release of Dedicated Cache Area with Dedicated Area Release Request]

Where a dedicated area release request is then issued in the process of the application program 22 (S404), the cache allocation management unit 204 executes the release processing of the dedicated cache area (S405). More specifically, the cache sector ID corresponding to the local sector ID in the sector ID conversion table is changed to ID=0 of the shared cache area (S406). Thus, the processing is performed as represented by S406 in FIG. 7. The size of the cache sector ID in the cache sector information setting unit 132 is changed to 0.

[Detailed Description of Dynamic Allocation Processing of Cache Area in Present Embodiment]

The dynamic allocation processing of a cache area is described below in greater detail. As indicated in FIG. 3, the dynamic allocation processing involves the determination processing S16 relating to a dedicated area acquisition request and the determination processing S18 performed at a regular allocation review timing. Before the processing of those two types is sequentially explained, the indicator of the allocation determination of a cache area is explained.

[Indicator of Allocation Determination of Cache Area]
[Effective Number of Cache Hits]

The object of dividing the cache memory into a shared cache area and a plurality of dedicated cache areas (including the disturbance processing cache area) is to maximize the number of cache hits per unit time in the entire cache memory. The number of cache hits per unit time is determined by the following equation.

$$\text{Number of cache hits per unit time} = (\text{cache hit rate}) * (\text{memory access frequency}) \quad (1)$$

Therefore, where the number of cache hits of the object processing of a dedicated area acquisition request is high when a dedicated cache area is allocated to the dedicated area acquisition request, the total number of cache hits is able to increased by allocating the dedicated cache area to the request. The value determined by Equation (1) is increased, the number of times the duration of access to the main memory is shortened is increased, and the memory access as a whole is shortened, when a dedicated cache area is allocated to the object processing with a somewhat low cache hit rate and a high memory access frequency, rather than when the dedicated cache area is allocated to the object processing with a high cache hit rate, but a low memory access frequency.

Meanwhile, the processing of the application program has a priority and the acceleration of a specific application program or a specific process is particularly desired. The higher the desirability is, the higher the processing priority is. Therefore, the actual objective of dynamic allocation of cache areas is the maximization of the following actual number of cache hits.

$$\text{Actual number of cache hits} = \Sigma[(\text{number of cache hits in processing}) * (\text{processing priority})] \quad (2)$$

Thus, in Equation (2) above, $\Sigma$ means that the product of the number of cache hits of the processing which is the object for the dedicated area acquisition request and the priority of this processing is accumulated for all of the processing operations.

[Locality of Memory Access]

Further, the processing which is the object for the dedicated area acquisition request can be with a high locality or low locality of memory access. The locality of memory access is high where the area of the memory access address is concentrated in a narrow range and the locality is low where the area is dispersed over a wide range. Where the locality of memory access of the object processing is low, the cache hit rate decreases. However, in some cases, the locality is increased by increasing the cache size, and thereby the cache hit rate is increased.

The relationship between the locality and the cache size may be understood by analyzing an example of the characteristic curve of the cache hit rate versus the cache size which is depicted in FIG. 5. In this example, when the cache size is small, since the cache size is less than the address range of memory access, the cache hit rate does not increase. However, as the cache size is increased, the cache size catches up with the address range of memory access, and the cache hit rate increases. After the cache size becomes larger that the reference value x, the cache hit rate does not increase anymore.

Where the locality of memory access is significantly low, the cache hit rate is not able to be increased and the cache mishit rate remains high even when the cache size is increased. Where the processing with such a high cache mishit rate is allocated to the shared cache area, cache mishits frequently occur and data of another processing are evicted. Such processing is called disturbance processing.

Therefore, allocating a dedicated cache area to such disturbance processing is more advantageous than allocating a shared cache area in terms of increasing the cache hit rate of the shared cache area. However, such disturbance processing generates frequent mishits even when the dedicated cache area is allocated. Therefore, the actual cache hit rate defined by Equation (2) does not increase. Accordingly, an effective method is to allocate a cache area for disturbance processing to the disturbance processing, and also allocate a common cache area for disturbance processing to a plurality of disturbance processing operations and separate those processing operations from other cache areas.

[Effective Cache Usage Degree, Priority-Added Effective Cache Usage Degree, and Cache Disturbance Force]

The effective cache usage degree, priority-added effective cache usage degree, and cache disturbance force are explained below as indicators of the determination as to whether to allocate a dedicated cache area to a dedicated area acquisition request.

The effective cache usage degree is a degree indicating the increase level of the number of cache hits when a dedicated cache area is allocated over the number of cache hits when a shared cache area is allocated.

$$\text{Effective cache usage degree} = \{[(\text{cache hit rate at the time a dedicated cache area is allocated}) - (\text{cache hit rate at the time a shared cache area is allocated})] * (\text{memory access frequency})\} / (\text{size of used dedicated cache area}) \quad (3)$$

In other words, the effective cache usage degree is an indicator which indicates, per unit cache area, the increase in the number of cache hits obtained by multiplying the memory access frequency (number of memory accesses per unit time) by a difference in the cache hit rate indicating how the cache hit rate increases when a dedicated cache area is allocated over that when a shared cache area is allocated.

In this case, the cache hit rate at the time a dedicated cache area is allocated and the memory access frequency are acquired from the results of the previously conducted characteristic examination, and the cache hit rate at the time a shared cache area is allocated is acquired at the time of production operation. Further, where the dedicated cache area has already been allocated, the cache hit rate is acquired for this allocated dedicated cache area. Therefore, for the allocated dedicated cache area, the estimated cache hit rate is determined by acquiring the actual cache hit rate relating to the allocated cache size, and multiplying the cache hit rate relating to the entire cache size obtained in the previous characteristic examination by a ratio of the acquired actual cache hit rate to the cache hit rate relating to the same cache size in the previous characteristic examination. The estimated cache hit rate will be described hereinbelow again in greater detail.

The processes of the application program have the above-mentioned priority, and the number of cache hits needs to be preferentially increased for the processing with a higher priority. Accordingly, as illustrated by Equation (4) below, the priority-added effective cache usage degree is calculated by multiplying the abovementioned effective cache usage degree by the priority of the corresponding processing.

Priority-added effective cache usage degree=(effective cache usage degree)*(corresponding processing priority)　　　(4)

In Equations (3) and (4), the priority-added effective cache usage degree of Equation (4) may rewritten by replacing the cache hit rate at the time the dedicated area is allocated with H(x) depicted in FIG. 5, replacing the cache hit rate at the time the shared area is allocated with BASEH, replacing the memory access frequency with MACCESS, replacing the size of the used dedicated cache area with x, and replacing the corresponding processing priority with PRIORITY.

Priority-added effective cache usage degree=[{$H(x)$-BASE$H$}*MACCESS*PRIORITY]/$x$　　　(4)

In the priority-added effective cache usage degree, the above-mentioned estimated cache hit rate may be also used with respect to the allocated dedicated cache area.

The effective cache usage degree presented in Equation (3) and the priority-added effective cache usage degree presented in Equation (4), which is obtained by multiplying the effective cache usage degree by the priority, are mainly used as indicators to determine whether or not a dedicated area is to be allocated with respect to the dedicated area acquisition request.

Further, as the aforementioned locality of memory access becomes significantly low, a force that evicts the data of other processing in the case of allocation to a shared cache area same as that of the other processing increases. This eviction force is assumed to be a cache disturbance force. The cache disturbance force is calculated by multiplying the cache mishit rate (1−(cache hit rate)) by the memory access frequency, as represented by Equation (5) below.

Cache disturbance force=(1−(cache hit rate))* (memory access frequency)　　　(5)

The cache disturbance force is a value opposite to the effective cache usage degree. Further, the cache disturbance force is calculated for each processing or each process in advance, since the cache hit rate and memory access frequency are acquired by the characteristic examination under the development environment. The processing in which the cache disturbance force is equal to or higher than a certain reference value is considered as cache disturbance processing, and the decrease in the cache hit rate of another processing is suppressed by the allocation to the disturbance processing cache area which is performed separately from the shared cache area or another dedicated cache area.

The cache disturbance force is used as an indicator for determining whether or not the allocation is to be performed to the dedicated area for disturbance processing when it is determined whether the dedicated area is to be allocated with respect to the dedicated area acquisition request.

[Dedicated Area Acquisition Request Determination Processing S16 (1)]

Figure 8:
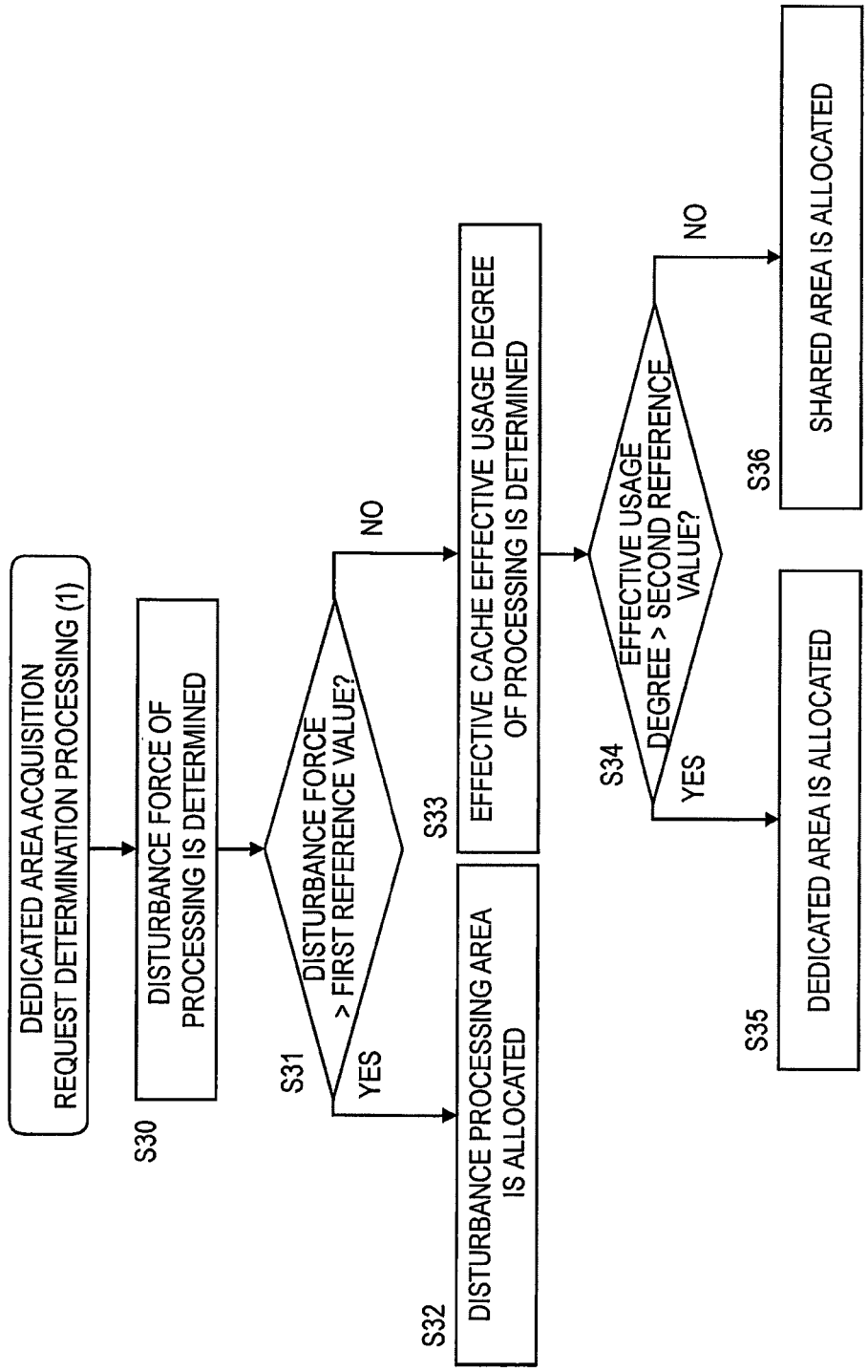
FIG. 8 is a flowchart representing the first example of determination processing S16 relating to the dedicated area acquisition request depicted in FIG. 3.

FIG. 8 is a flowchart representing the first example of determination processing S16 relating to the dedicated area acquisition request depicted in FIG. 3. In the first determination processing, the cache allocation management unit 204 in the OS 20 determines, by calculation, the cache disturbance force (Equation (5)) of the object processing of the dedicated area acquisition request (S30) and, when the cache disturbance force is higher than a first reference value (YES in S31), allocates the disturbance processing cache area to the dedicated area acquisition request (S32).

Then, where the cache disturbance force is equal to or less than the first reference value (NO in S31), the cache allocation management unit 204 determines, by calculation, the priority-added effective cache usage degree (Equation (4)) of the object processing of the dedicated area acquisition request (S33). Where the priority-added effective cache usage degree is higher than the second reference value (YES in S34), the cache allocation management unit allocates (S35) the dedicated cache area to the dedicated area acquisition request, and where the priority-added effective cache usage degree is equal to or lower than the second reference value (NO in S34), the cache allocation management unit allocates the shared cache area to the dedicated area acquisition request (S36).

Figure 9:
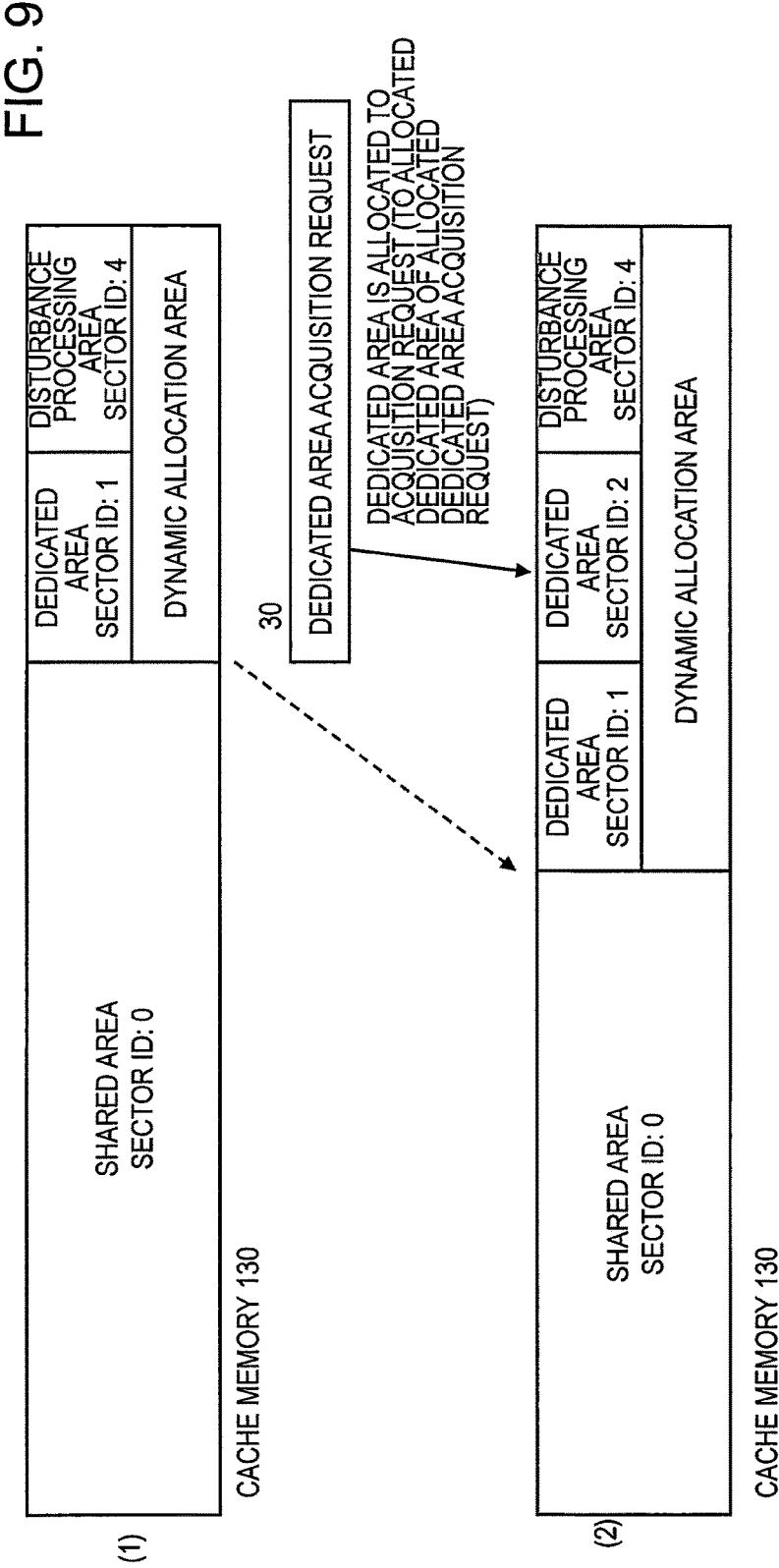
FIG. 9 illustrates the case in which the dedicated cache area is allocated to the dedicated area acquisition request.

FIG. 9 illustrates the case in which the dedicated cache area is allocated to the dedicated area acquisition request. The dedicated area acquisition request 30 is supposed to be issued in a divided state of the cache memory 130 indicated by (1) in FIG. 9. In this case, the priority-added effective cache usage degree of the object processing of the dedicated area acquisition request is calculated on the basis of Equation (4). Where the priority-added effective cache usage degree is higher than the second reference value, the dedicated cache area with the cache sector ID=2 is allocated with respect to the dedicated area acquisition request 30, as in the cache memory 130 indicted by (2) in FIG. 9. As a result, the dedicated cache area that has been allocated is referred to hereinbelow as an allocated dedicated area, and the dedicated area acquisition request to which the dedicated cache area has been allocated is referred to hereinbelow as an allocated dedicated area acquisition request.

The size of the dedicated cache area which is to be allocated is explained below. As illustrated in FIG. 5, the cache hit rate of the processing increases rapidly with the increase in the cache size and reaches saturation at a certain reference cache size x1. Accordingly, it is desirable that the priority-added effective cache usage degree be calculated on the basis of a cache hit rate at the reference cache size x1 in a characteristic curve of the cache hit rate versus the cache size which is depicted in FIG. 5. When the priority-added effective cache usage degree calculated in such a manner is greater than the second reference value, the size of the dedicated cache area which is to be allocated with respect to the dedicated area acquisition request is desirably set to the reference cache size x1.

Where the cache size of the dedicated cache area is thus automatically allocated to the reference cache size x1, the optimum cache size can be allocated.

According to FIG. 9, where the dedicated cache areas are successively allocated to the dedicated area acquisition request with the priority-added effective cache usage degree higher than the second reference value, the cache memory 130 is overflown with the dedicated cache areas. Accordingly, the cache memory is prevented from being overflown with the dedicated cache areas by normalizing the balance between the shared cache area and the dedicated cache areas by the below-described regular allocation review processing (3).

[Dedicated Area Acquisition Request Determination Processing S16 (2)]

Figure 10:
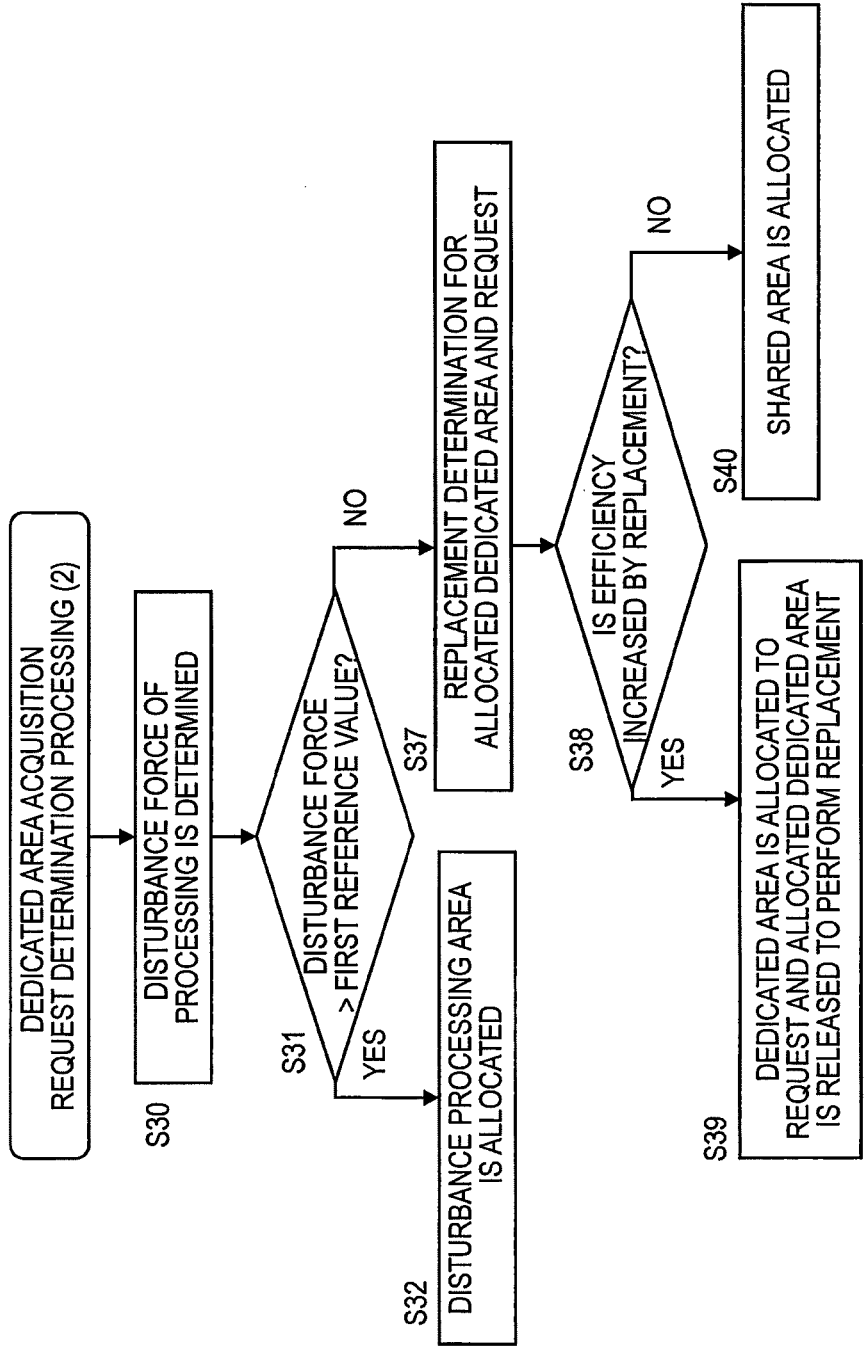
FIG. 10 is a flow chart representing the second example of determination processing S16 of the dedicated area acquisition request depicted in FIG. 3.

FIG. 10 is a flow chart representing the second example of determination processing S16 of the dedicated area acquisition request depicted in FIG. 3. In the second determination processing, the cache allocation management unit 204 in the OS 20 calculates the cache disturbance force of the object processing of the dedicated area acquisition request and, when the cache disturbance force is higher than the first reference value, allocates the disturbance processing cache areas (S30, S31, and S32), in the same manner as described hereinabove. Where the cache disturbance force is equal to or lower than the first reference value, the cache allocation management unit 204 performs comparative determinations of the priority-added effective cache usage degree (desirably, the increase rate of the priority-added effective cache usage value) of the allocated dedicated area and the object processing of the dedicated area acquisition request (S37), and where the replacement ensures higher efficiency (YES in S37), allocates the dedicated area to the dedicated area acquisition request and releases the allocated dedicated area, thereby replacing one with the other (S39). Conversely, where the replacement is not efficient (NO in S38), the shared cache area is allocated to the dedicated area acquisition request (S40).

Figure 11:
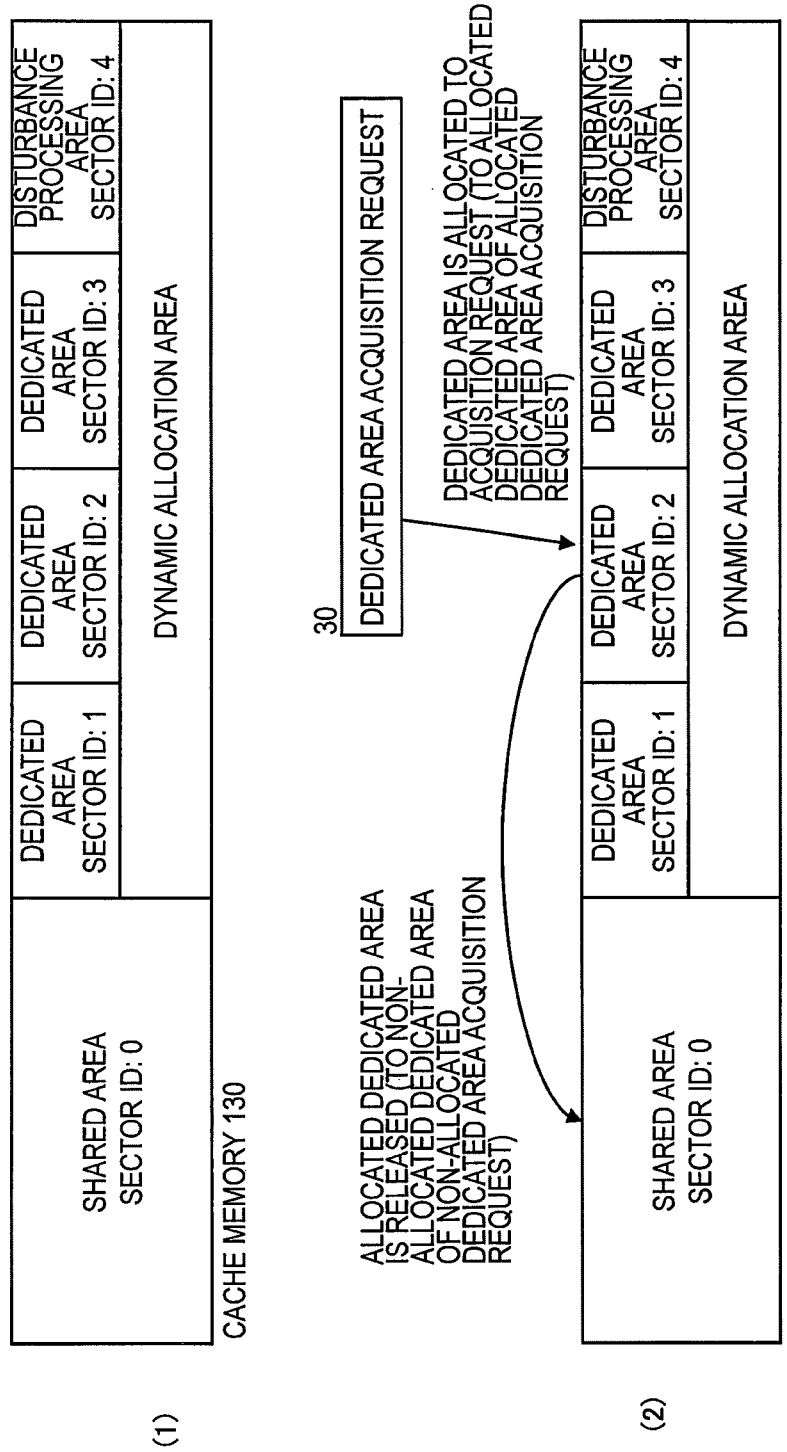
FIG. 11 illustrates the processing of replacing the dedicated cache area between the dedicated area acquisition request and the allocated dedicated area acquisition request.

FIG. 11 illustrates the processing of replacing the dedicated cache area between the dedicated area acquisition request and the allocated dedicated area acquisition request. Where the dedicated area acquisition request 30 is issued in the division state such as that of the cache memory 130 represented by (1) in FIG. 11, when the cache disturbance force of the object processing thereof is equal to or less than the first reference value, it is determined whether or not the number of cache hits in the entire cache memory will be increased by allocating a new dedicated area in replace of the allocated dedicated area.

In the example illustrated in FIG. 11, since the priority-added effective cache usage degree of the object processing of the dedicated area acquisition request is higher than the priority-added effective cache usage degree of the allocated dedicated area with the cache sector ID=2 exceeding an overhead value needed for the replacement, the allocated dedicated area is released and moved to the shared cache area, and a new dedicated cache area is instead allocated to the dedicated area acquisition request.

The abovementioned comparative determination S37 is explained below.

The cache hit rate is obtained differently in the case in which the dedicated cache area has already been allocated and the case in which it has not yet been allocated. Thus, an estimated cache hit rate is used with respect to the already allocated dedicated area, and the cache hit rate that has been acquired in the preliminary examination is used with respect to the non-allocated dedicated area.

Figure 12:
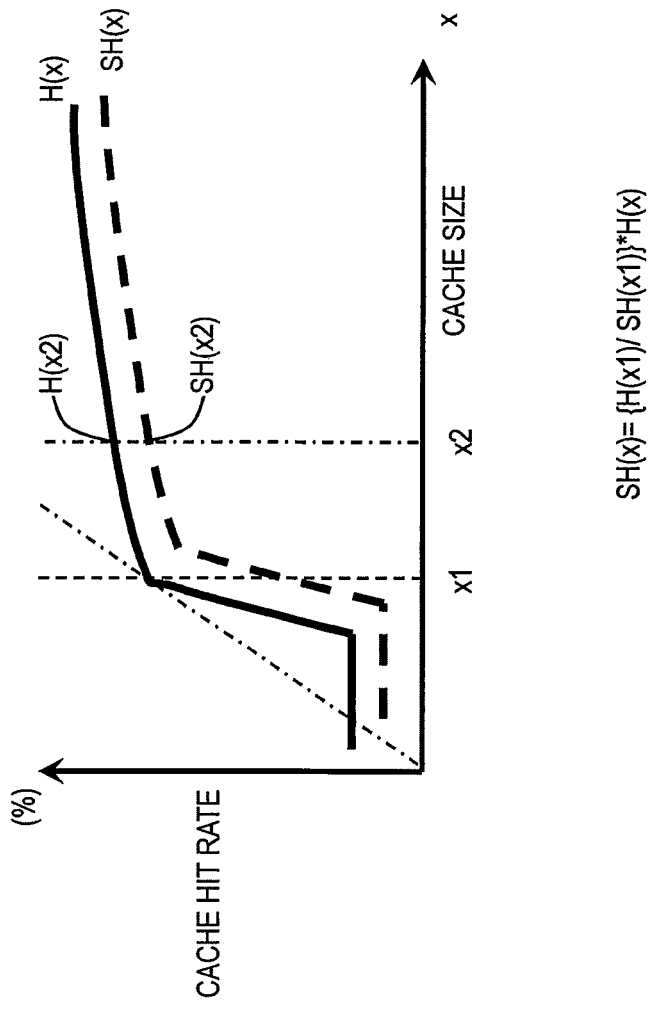
FIG. 12 depicts the estimated cache hit rate.

FIG. 12 depicts the estimated cache hit rate. In the figure, the cache size is plotted against the abscissa, and the cache hit rate is plotted against the ordinate. The solid line $H(x)$ is a characteristic curve of the cache hit rate versus the cache size that has been acquired in the preliminary examination. By contrast, in the case of the allocated dedicated cache area, the cache hit rate corresponding to the allocated cache size $x2$ can be acquired from a counter located in the cache system.

In this case, the estimated cache hit rate $SH(x)$ is obtained by multiplying the cache hit rate $H(x)$ for all cache sizes at the time of the preliminary examination by a ratio $SH(x2)/H(x2)$ of the present cache hit rate $SH(x2)$ at the cache size $x2$ and the cache hit rate $H(x2)$ at the time of the preliminary examination. Thus, the following Equation (6) can be used.

$$SH(x)=\{SH(x2)/H(x2)\}*H(x) \tag{6}$$

Where the estimated cache hit rate $SH(x)$ is used, the priority-added effective cache usage degree of the allocated dedicated cache area can be derived from Equation (4) above according to the following Equation (7).

$$CCn=[\{SH(x)-BASEH\}*MACCESSn*PRIORITYn]/x \tag{7}$$

Here, n indicates the object processing of the dedicated area acquisition request. Therefore, Equation (7) represents the priority-added effective cache usage degree using the estimated cache hit rate $SH(x)$ relating to single certain object processing. The priority-added effective cache usage degree for a non-allocated dedicated area acquisition request is represented by the aforementioned Equation (4) and becomes as follows:

$$\text{Priority-added effective cache usage degree } n=[\{H(x)-BASEH\}*MACCESSn*PRIORITYn]/x \tag{4}$$

A dedicated cache area of a certain size x is allocated to the dedicated area acquisition request. Therefore, considering the increase value of the priority-added effective cache usage degree per unit area (increase rate of the priority-added effective cache usage degree) is an effective way for determining the replacement with the allocated dedicated cache area. In such a way, it is possible to consider how the priority-added effective cache usage degree changes by either increasing the size of the allocated dedicated cache area by +1 or decreasing it by −1.

The increase rate $CHHn(x)$ of the abovementioned priority-added effective cache usage degree $CCn$ is an increase amount of the priority-added effective cache usage degree at the time the size of the dedicated cache area which is to be allocated is increased from x−1 to x. The transition is thus made from Equation (7) to Equation (8)

$$CHHn(x)=\{SH(x)-SH(x-1)\}*MACCESSn*PRIORITYn \tag{8}$$

As follows from Equation (8), since no division by the area size x, such as in Equation (7), is performed, the $CHHn(x)$ is the increase rate of the priority-added effective cache usage number. Equation (8) is referred to hereinbelow as the increase rate of the priority-added effective cache usage number.

When a dedicated area is not allocated to a dedicated area acquisition request, the estimated cache hit rate $SH(x)$ is not able to be used. Therefore, the cache hit rate $H(x)$ obtained in the preliminary examination is used and the increase rate $CHHn(x)$ of the priority-added effective cache usage number represented by Equation (8) is represented by the following Equation (9).

$$CHHn(x)=\{H(x)-H(x-1)\}*MACCESSn*PRIORITYn \tag{9}$$

In the determination step S37 of the present embodiment, an allocated dedicated area list LIST_FREE is used which is obtained by calculating the increase rate of the priority-added effective cache usage number, which is represented by Equation (8), with respect to the allocated dedicated cache area. This allocated dedicated area list LIST-FREE is explained below.

Figure 13:
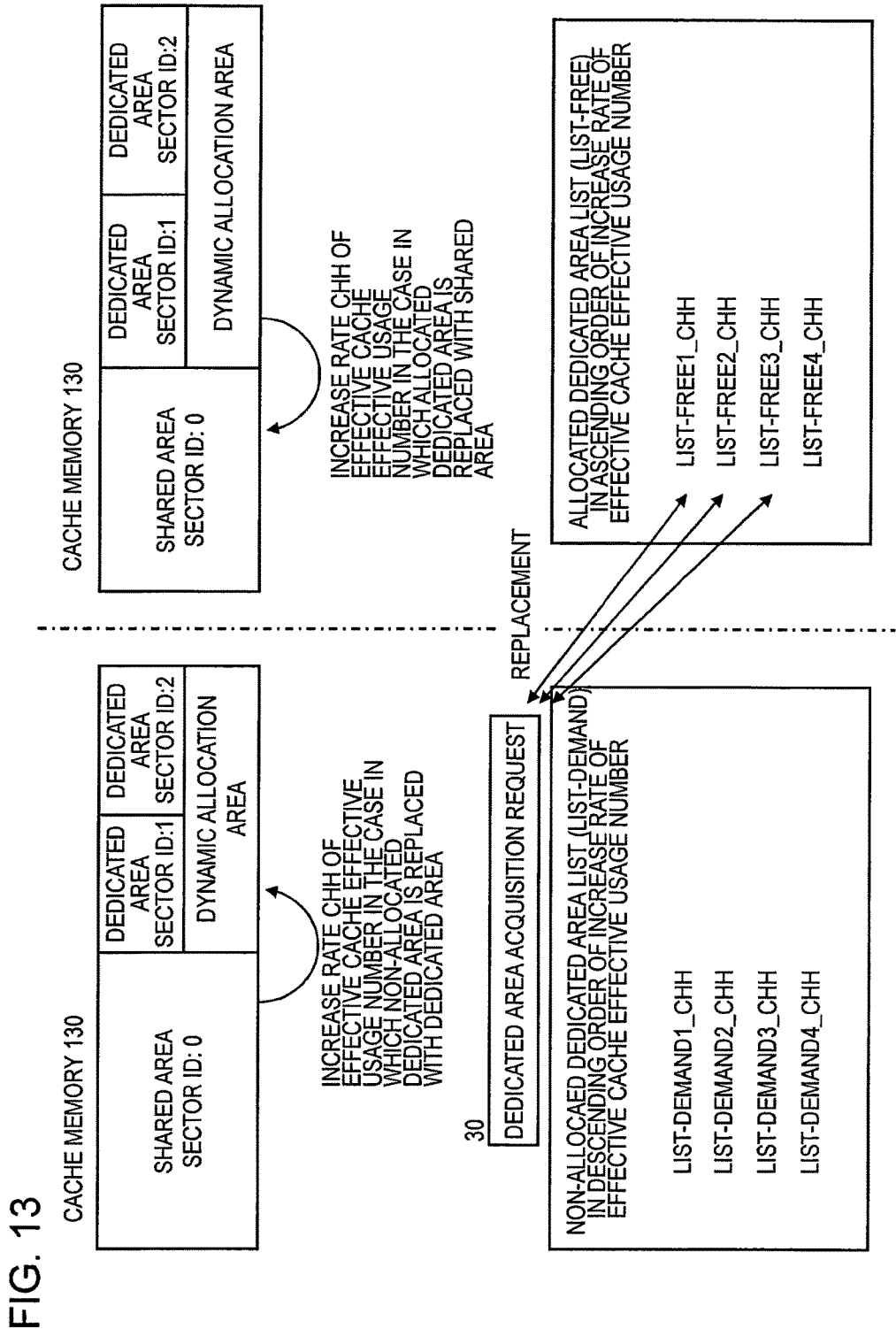
FIG. 13 illustrates the allocated dedicated area list LIST-FREE and a non-allocated dedicated area list LIST-DEMAND.

FIG. 13 illustrates the allocated dedicated area list LIST-FREE and a non-allocated dedicated area list LIST-DEMAND. The allocated dedicated area list LIST-FREE is depicted on the right side in FIG. 13. Thus, Equation (8) is used to calculate the increase rate of the priority-added effective cache usage number in the case in which the allocated dedicated areas (cache sector ID=1, 2) are replaced with the shared cache area (code sector ID=0) in the cache memory 130, and the increase rates are registered in ascending order in the allocated dedicated area list LIST-FREE. The increase rate being small means that the decrease in the actual number of cache hits in the case in which the allocated dedicated area is replaced with the shared area as a unit area is small, and it means that small contribution is made to the effective usage of the present cache memory.

As indicated hereinabove, in the allocated dedicated area list LIST-FREE presented on the right side in FIG. 13, the increase rate (LIST-FREE. CHH) is arranged in ascending order of the increase rate.

The non-allocated dedicated area list LIST-DEMAND is depicted on the left side in FIG. 13. Where a dedicated area is not allocated with respect to a dedicated area acquisition request in the cache memory 130, a shared area is allocated, or where a dedicated area of a partial size is allocated with respect to the dedicated area acquisition request, the remaining size is allocated to the shared area. Therefore, those non-allocated dedicated areas that have not been allocated to the dedicated areas are included in the non-allocated dedicated area list LIST-DEMAND.

Equation (9) is used to calculate the increase rate of the priority-added effective cache usage number in the case in which such non-allocated dedicated area are replaced from the shared area to the dedicated area, and the increase rates are registered in descending order in the non-allocated dedicated area list LIST-DEMAND. The increase rate being large means that the increase in the actual number of cache hits in the case in which the non-allocated dedicated area is replaced from the shared area to the dedicated area is large, and it means that the replacement makes a large contribution to the effective usage of the cache memory.

As indicated hereinabove, in the non-allocated dedicated area list LIST-DEMAND presented on the left side in FIG. 13, the increase rate (LIST DEMAND. CHH) is arranged in descending order of the increase rate.

Accordingly, in the determination step S37 of the present embodiment, where the difference between the increase in the priority-added effective cache usage number in the case in which a dedicated area has been allocated with respect to the dedicated area acquisition request 30 and the decrease in the priority-added effective cache usage number of the allocated dedicated area that has been registered in the allocated dedicated area list LIST-FREE exceeds an overhead value needed to the replacement, it is determined that the replacement is to be made and a dedicated area is to be allocated to the dedicated area acquisition request.

This determination is based on whether or not the following Equation (10) is satisfied.

$$y*CCn(y)-\Sigma(m=1\sim y)\text{LIST-FREE}m\cdot CHH > OVH2*\{\Sigma(m=1\sim y)\text{LIST-FREE}m\cdot \text{PRIORITY}\} \quad (10)$$

Here, y is the size y of the dedicated area, m is the number in the list, LIST-FREEm. CHH is the increase rate of the priority-added effective cache usage number, OVH2 is the overhead value needed for the replacement, and LIST-FREEm. PRIORITY is the priority of the processing. In other words, the overhead value OVH2 is weighted with the priority.

The cache allocation unit 204 in the OS20 determines Equation (10) from y=1 to y=maximum size, and takes the maximum size y at which the condition of Equation (10) is fulfilled as the size of the dedicated area which is to be allocated to the dedicated area acquisition request. Thus, the replacement illustrated by arrows between the dedicated area acquisition request 30 and the allocated dedicated area list LIST-FREE in FIG. 13 is performed. As a result, the allocated dedicated area corresponding to the size y is released to the shared area. Where Equation (10) is not fulfilled at any size y, no dedicated area is allocated to the dedicated area acquisition request.

As depicted in FIG. 12, the characteristic of the cache hit rate tends to increase rapidly as the cache size increases to a certain level. Therefore, the size y at which Equation (10) is fulfilled can be formed by increasing by 1 the size y of the dedicated area which is to be newly allocated. In particular, Equation (10) is sometimes fulfilled when the size y is in the vicinity of the reference value x1.

The relationship between the cache size y at which the condition of Equation (10) is fulfilled and the cache size requested by the dedicated area acquisition request 30 is, for example, as follows. Where the cache size at which the condition is fulfilled is equal to or less than the requested cache size, the efficiency of the cache memory is able to be increased by allocating the size from the cache size y to the requested cache size. Meanwhile, where the cache size y exceeds the requested cache size, it is determined that the condition of Equation (10) is not fulfilled and it is preferred that no dedicated area be allocated.

Figure 24:
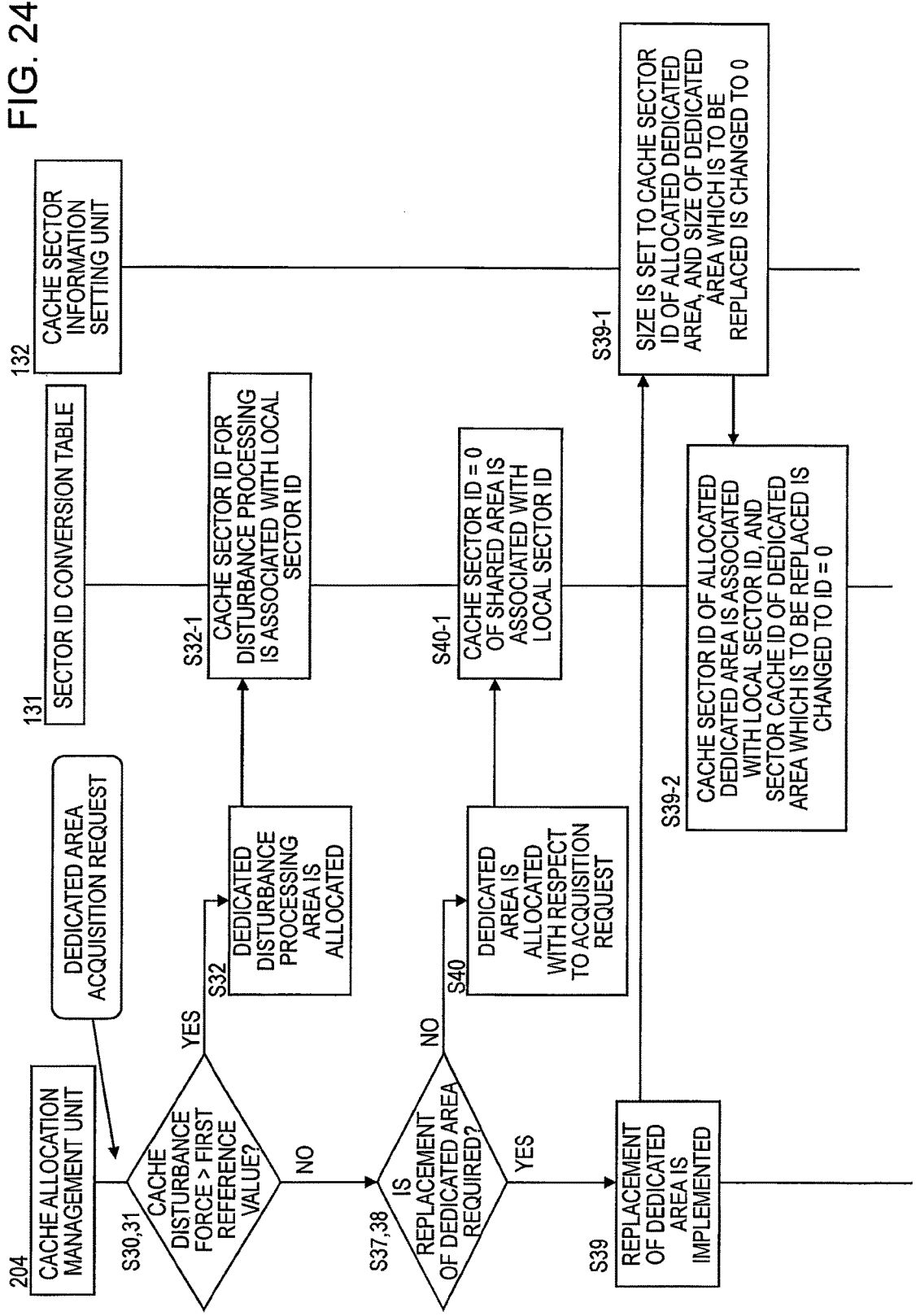
FIG. 24 is a flowchart diagram of the present dedicated area acquisition request determination processing S16 (2).

FIG. 24 is a flowchart diagram of the present dedicated area acquisition request determination processing S16 (2). The processing steps same as those depicted in FIG. 10 are assigned with the same numbers. First, the cache allocation management unit 204 determines whether the cache disturbance force exceeds the first reference value (S30, 31). Where the cache disturbance force exceeds the first reference value, a dedicated disturbance processing cache area is allocated (S32). As a result, the cache sector ID of the disturbance processing cache area is linked with the local sector ID of the dedicated area acquisition request in the sector ID conversion table 131 (S32-1).

Where the cache disturbance force does not exceed the first reference value, the cache allocation management unit 204 determines whether or not a dedicated cache area is to be allocated, on the basis of whether or not a size y is present at which Equation (10) is fulfilled (S37, 38). Where the condition is not fulfilled, the cache allocation management unit 204 allocates a shared area with respect to the dedicated area acquisition request (S40), and where the condition is fulfilled, the cache allocation management unit instructs the hardware to allocate a dedicated area of the size y with respect to the dedicated area acquisition request (S39).

In the hardware, the cache allocation management unit 204 sets the dedicated cache area that is to be newly allocated and the size y thereof in the cache sector information setting unit 132 (S39-1). Further, the deletion of the cache sector ID of the allocated dedicated area which is the object of replacement and the size change are performed at the same time (S39-1). Then, the cache allocation management unit 204 links the cache sector ID of the dedicated cache area, which has been allocated, with the local sector ID of the dedicated area acquisition request in the sector ID conversion table 131 (S39-2).

[Regular Allocation Review Processing S18]

Three examples of the regular allocation review processing S18 depicted in FIG. 3 are explained below. In response to the dedicated area acquisition request, the cache allocation management unit 204 in the OS 20 determines whether or not a dedicated cache area is to be allocated and whether or not the allocated dedicated area is to be replaced thereby.

Meanwhile, the cache allocation management unit 204 regularly, for example, every 2 sec, performs the determination as to whether the allocated dedicated area that has been allocated to the dedicated area acquisition request and the non-allocated dedicated area that has not yet been allocated to the dedicated area acquisition request are to be replaced (Example 1, Example 2), and when the ratio of the sizes of the shared area and all of the dedicated areas deviates from the ideal value based on the ratio of access frequencies, the determination as to whether to allocate newly the shared area as a dedicated area to the non-allocated dedicated area acquisition request, or as to whether to release the allocated dedicated area and replace it with the shared area (Example 3). Those determinations use the aforementioned allocated dedicated area list LIST-FREE and the non-allocated dedicated area list LIST-DEMAND.

[Regular Allocation Review Processing S18 (1)]

Figure 14:
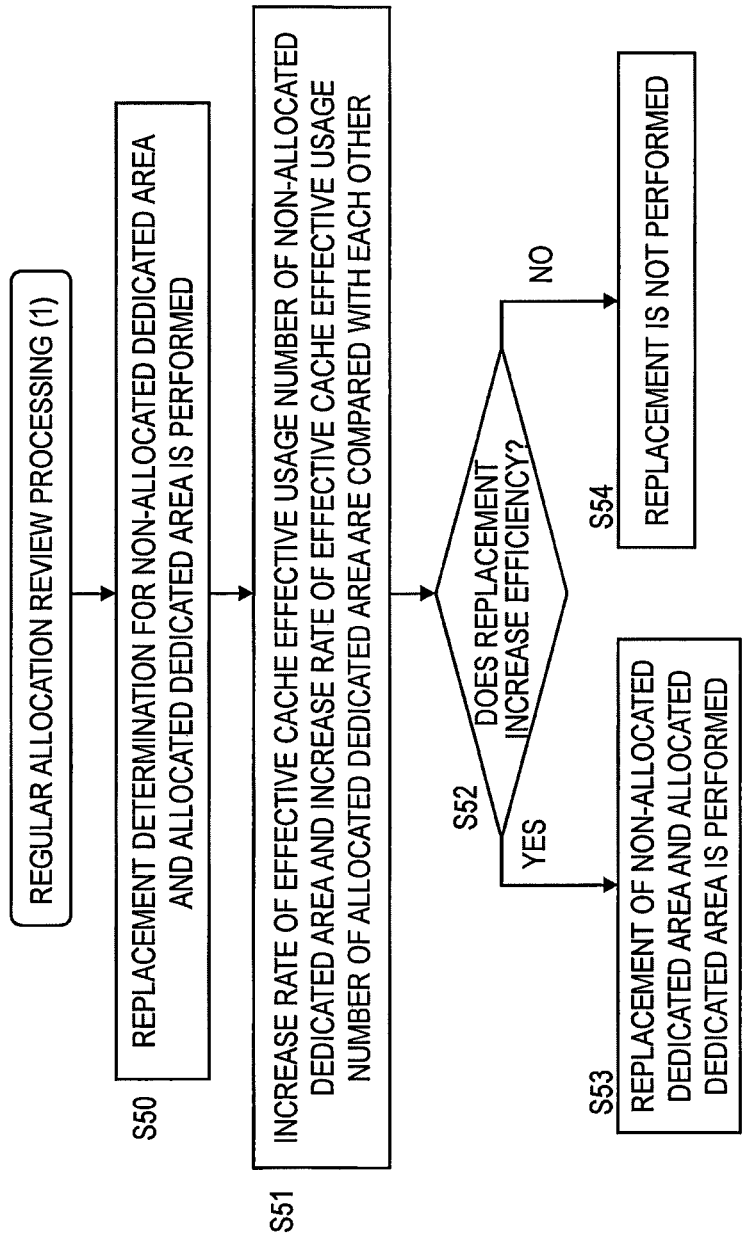
FIG. 14 is a flowchart diagram of the first example of the regular allocation review processing S18.
Figure 15:
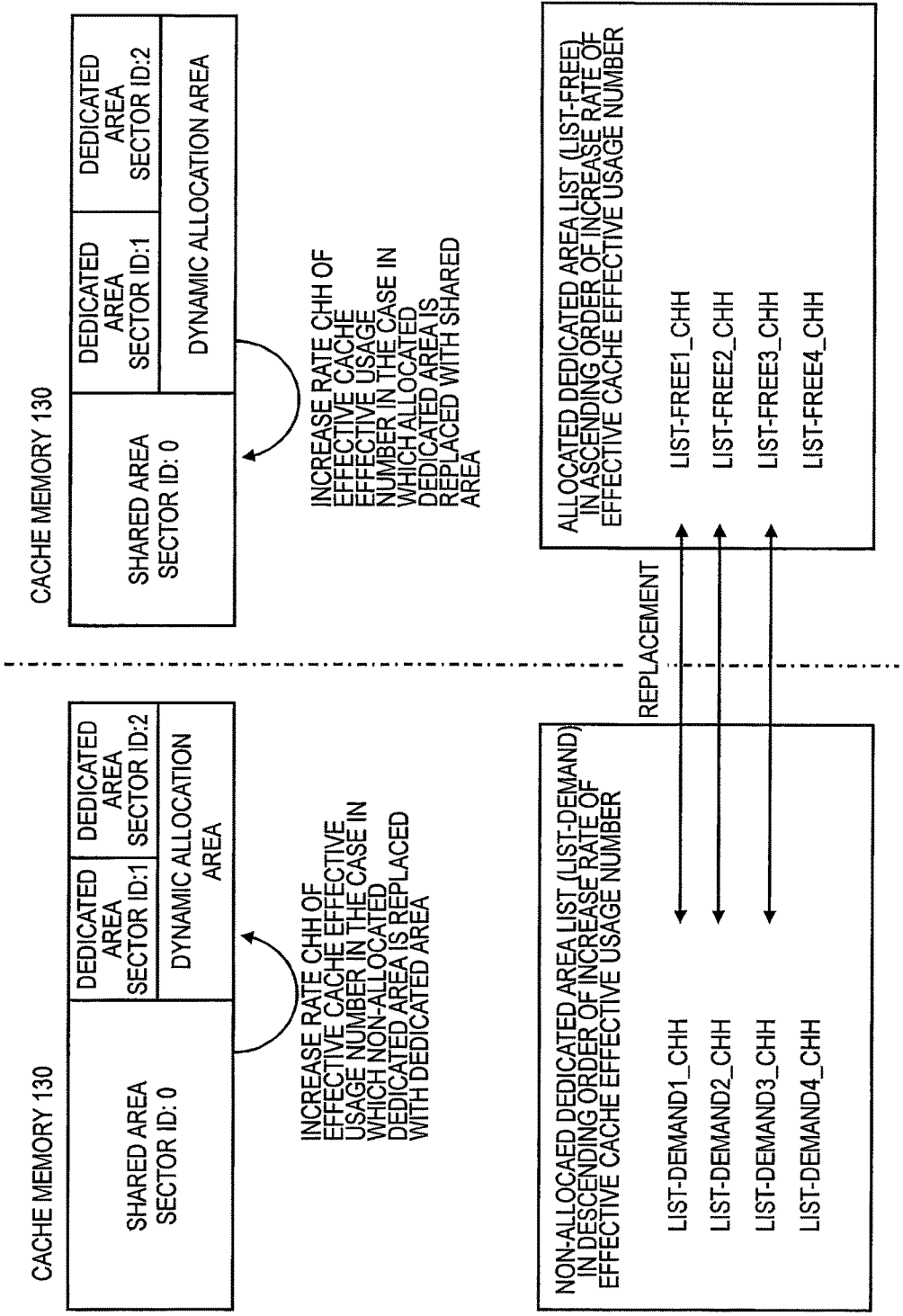
FIG. 15 illustrates the first example of the regular allocation review processing S18.

FIG. 14 is a flowchart diagram of the first example of the regular allocation review processing S18. FIG. 15 illustrates the first example of the regular allocation review processing S18. In the regular allocation review processing S18 in FIG. 14, the cache allocation management unit 204 performs the replacement determination for the non-allocated dedicated area and the allocated dedicated area (S50). In this determination processing, the increase rate $CHHn(x)$ of the priority-added effective cache usage number of the non-allocated dedicated area in the non-allocated dedicated area list LIST-DEMAND explained with reference to FIG. 13 is compared with the increase rate $CHHn(x)$ of the priority-added effective cache usage number of the allocated dedicated area in the allocated dedicated area list LIST-FREE (S51). As the comparison object, for example, as illustrated by the arrows in FIG. 15, the maximum increase rate at the uppermost level in the non-allocated dedicated area list LIST-DEMAND is compared with the minimum increase rate at the uppermost level in the allocated dedicated area list LIST-FREE, and the increase rates at the lower levels are similarly compared.

Where the condition of the Equation (11) below is fulfilled, it is supposed that the efficiency is increased by the replacement (S52).

$$\text{LIST-DEMAND}m \cdot CHH - \text{LIST-FREE}m \cdot CHH > OVH2 * \text{LIST-FREE}m \cdot \text{PRIORITY} \quad (11)$$

Here, m is the order number in the list, OVH2 is the overhead value needed for the replacement, and LIST-FREEm·PRIORITY is the priority of processing in the allocated dedicated area list LIST-FREE. In other words, it is supposed that the replacement increases the efficiency when the difference between the increase rate of the non-allocated dedicated area of the comparison object and the increase rate of the allocated dedicated area is greater than a value obtained by weighting the overhead value OVH2, which corresponds to the replacement, with the priority.

The condition of Equation (11) is determined sequentially from the head (m=1) of the two lists, and the determination is repeatedly performed up to a number at which the condition becomes unfulfilled. However, since the priority LIST-FREEm·PRIORITY is inserted into Equation (11), the value of the right side of the equation changes according to the priority. Therefore, the object for comparison with the maximum increase rate CHH at the uppermost level in the non-allocated dedicated area list LIST-DEMAND includes not only the maximum increase rate CHH at the uppermost level in the allocated dedicated area list LIST-FREE, but also the increase rates CHH at levels successively lower than the maximum level. Where a combination satisfying Equation (11) is found, the respective increase rates become the replacement objects. The comparison is then performed in the same manner as described hereinabove with respect to the next increase rate CHH in the non-allocated dedicated area list LIST-DEMAND, and a combination satisfying Equation (11) is detected.

Where the efficiency is supposed to be increased by the replacement, the cache allocation management unit 204 performs the processing of replacing the non-allocated dedicated area with the allocated dedicated area (S53). More specifically, a new dedicated area is allocated to the non-allocated dedicated area in the cache sector information setting unit 132, the size to be allocated is registered, and the cache sector ID of the dedicated area that is to be newly allocated is linked with the local sector ID of the non-allocated dedicated area acquisition request in the sector ID conversion table. Conversely, the registration of the allocated dedicated area in the cache sector information setting unit 132 is canceled, and the cache sector ID that has been linked with the local sector ID of the allocated dedicated area acquisition request in the sector ID conversion table is changed to the ID of the shared area.

Further, where the replacement processing is performed, the increase rate of the dedicated area which has been replaced is caused to move from the non-allocated dedicated area list LIST-DEMAND to the allocated dedicated area list LIST-FREE and, at the same time, caused to move from the allocated dedicated area list LIST-FREE to the non-allocated dedicated area list LIST-DEMAND. Resorting is then performed on the basis of the values of the increase rate CHH in each list.

Where the efficiency is not supposed to be increased by the replacement, the cache allocation management unit 204 does not perform the processing of replacing the non-allocated dedicated area with the allocated dedicated area (S54).

[Regular Allocation Review Processing S18 (2)]

Figure 16:
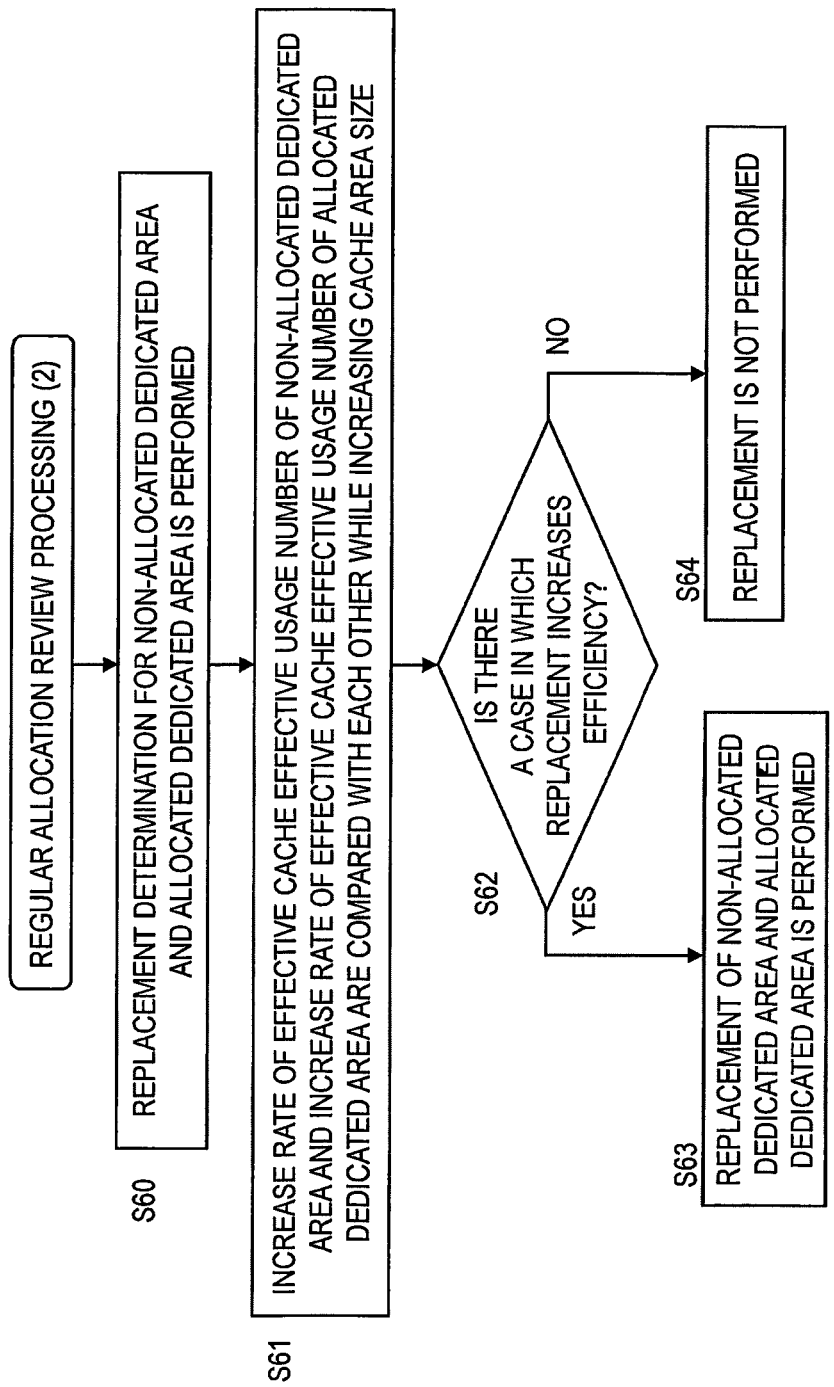
FIG. 16 is a flowchart diagram of the second example of the regular allocation review processing S18.
Figure 17:
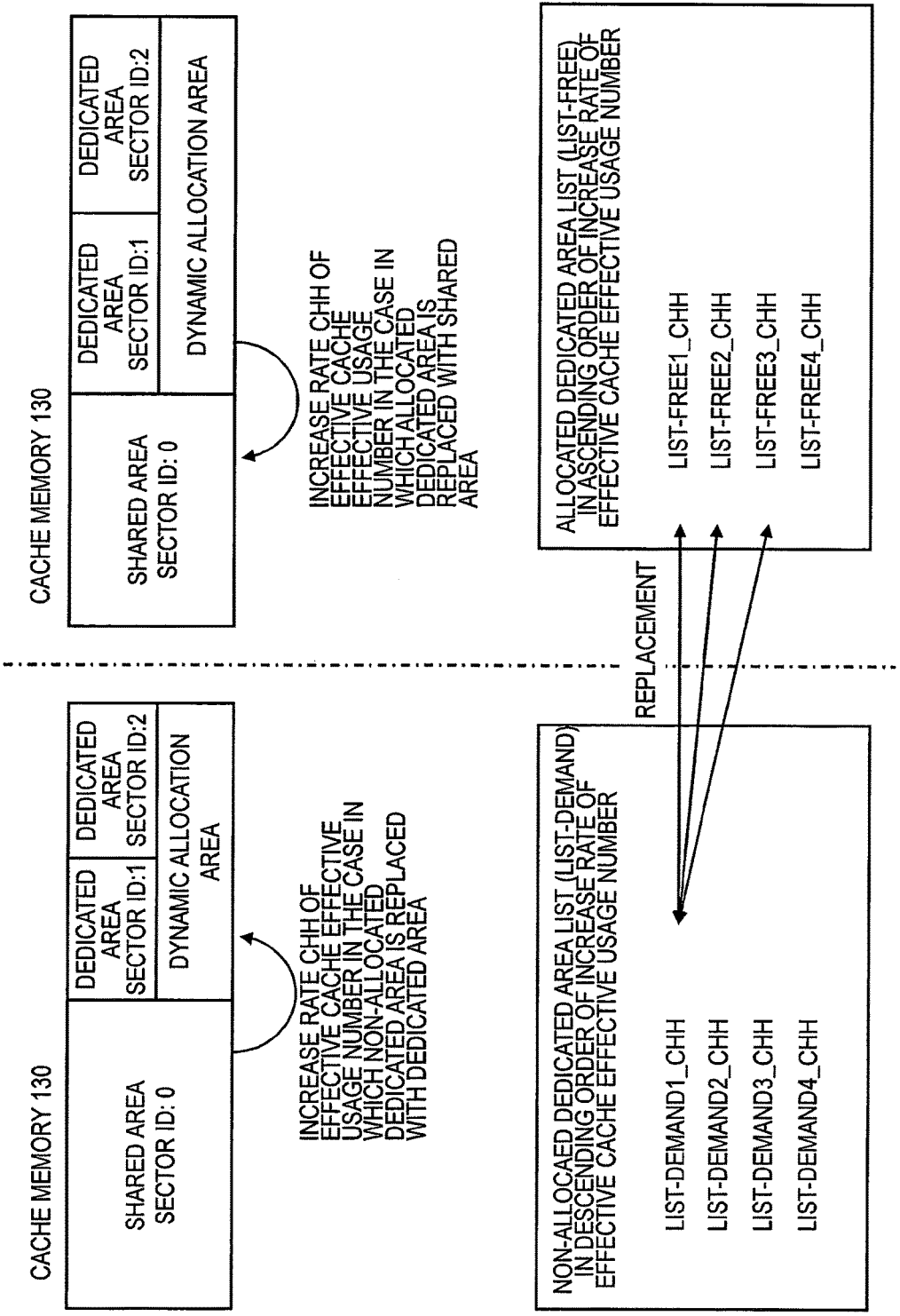
FIG. 17 illustrates the second example of the regular allocation review processing S18.

FIG. 16 is a flowchart diagram of the second example of the regular allocation review processing S18. FIG. 17 illustrates the second example of the regular allocation review processing S18. In the regular allocation review processing S18 in FIG. 16, the cache allocation management unit 204 performs the replacement determination for the non-allocated dedicated area and the allocated dedicated area (S60). In this determination processing, as indicated in FIG. 17, the cumulative values of two increase rates are compared while increasing the dedicated cache area size x of the increase rate LIST-DEMAND1. $CHH(x)$ of the priority-added effective cache usage number of the non-allocated dedicated area at the head of the non-allocated dedicated area list LIST-DEMAND and while adding, from the head, the increase rate LIST-FREEm. $CHH(x)$ of the priority-added effective cache usage number of the allocated dedicated area in the allocated dedicated area list LIST-FREE (S61).

The determination S61 is performed on the basis of whether or not the following Equation (12) is fulfilled.

$$\Sigma(x=1\sim y)\text{LIST-DEMAND1} \cdot CHH(x) - \Sigma(m=1\sim y)\text{LIST-FREE}m \cdot CHH > OVH2 * \{\Sigma(m=1\sim y)\text{LIST-FREE}m \cdot \text{PRIORITY}\} \quad (12)$$

Here, y is the size y of the dedicated area, m is the order number in the list, LIST-DEMAND1·$CHH(x)$ and LIST-FREEm·CHH are the increase rates of the priority-added effective cache usage number, OVH2 is the overhead value needed for the replacement, and LIST-FREEm·PRIORITY is the priority of the processing. Here, the overhead value OVH2 is also weighted by the priority.

The cache allocation management unit 204 in the OS 20 performs the determination by Equation (12) while increasing y from 1 and detects the maximum size y at which the condition of Equation (12) is fulfilled. Thus, the increase rate LIST-DEMAND1·CHH(x) of the priority-added effective cache usage number is the increase amount of the priority-added effective cache usage number in a case where the unit size is increased. Further, the cache hit rate tends to increase with the increase in the size x of the dedicated cache area, as illustrated in FIG. 12. The increase rate LIST-DEMAND1 CHH(x) of the priority-added effective cache usage number of the non-allocated dedicated area with the size x for maximizing the increase rate is compared with the increase rate of the allocated dedicated area of the same size x, thereby obtaining the replacement object. The approach is the same as with Equation (10).

Where the abovementioned Equation (12) is fulfilled and the efficiency is supposed to be increased by the replacement, the cache allocation management unit 204 performs the processing of replacing the non-allocated dedicated area with the allocated dedicated area (S63). Where the efficiency is not supposed to be increased by the replacement, the cache allocation management unit 204 does not perform the replacement processing (S64).

The relationship between the cache size requested by the non-allocated dedicated area acquisition request 30 and the cache size y at which Equation (12) is fulfilled is the same as has been explained in FIG. 13 in relation to the dedicated area acquisition request determination processing (2). In other words, where the cache size at which Equation (12) is fulfilled is equal to or less than the requested cache size y, a size between the size y and the requested size is allocated. Where the cache size y exceeds the requested cache size, Equation (12) is assumed not to be fulfilled and the replacement processing is not performed.

[Regular Allocation Review Processing S18 (3)]

Figure 18:
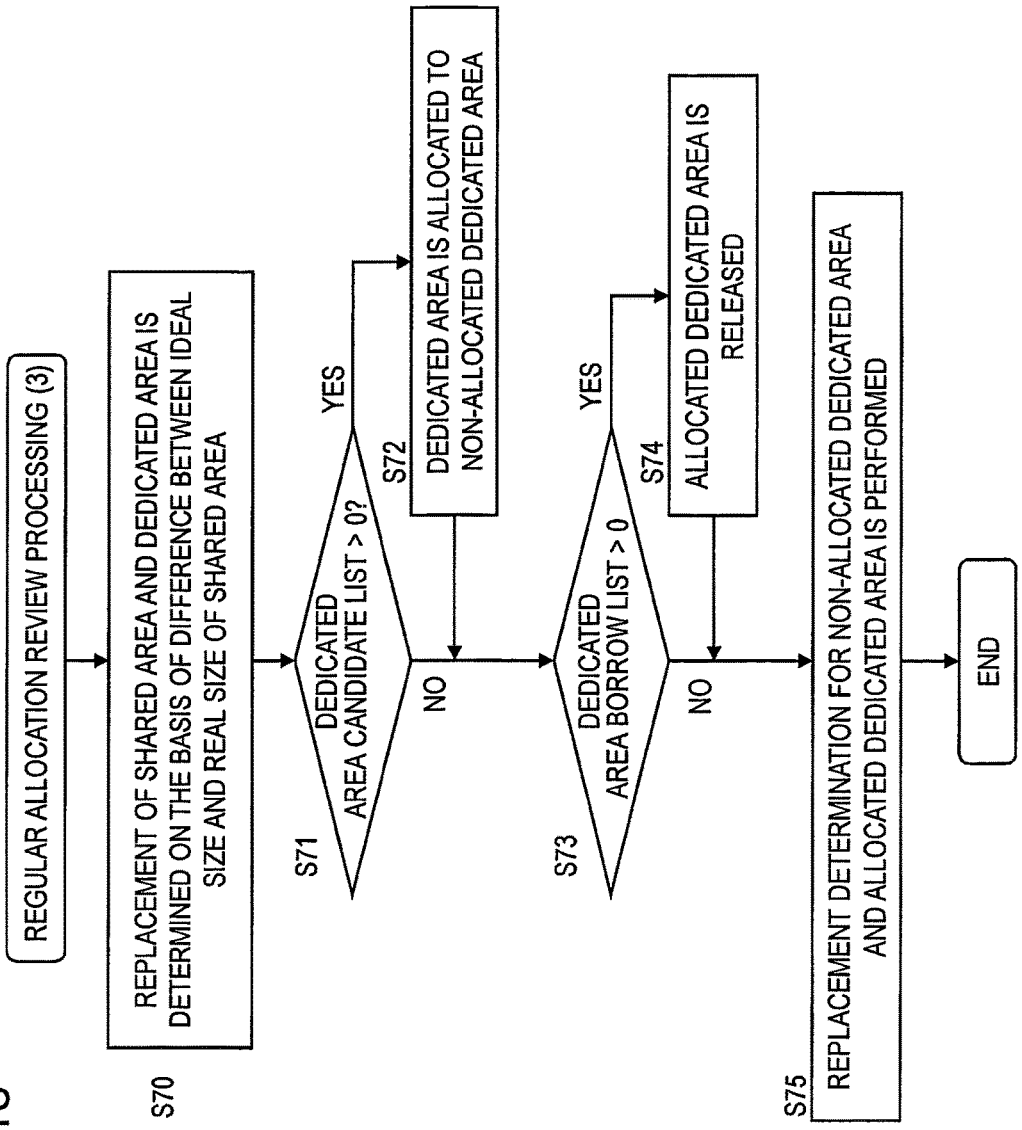
FIG. 18 is a flowchart diagram of the third example of the regular allocation review processing S18.
Figure 19:
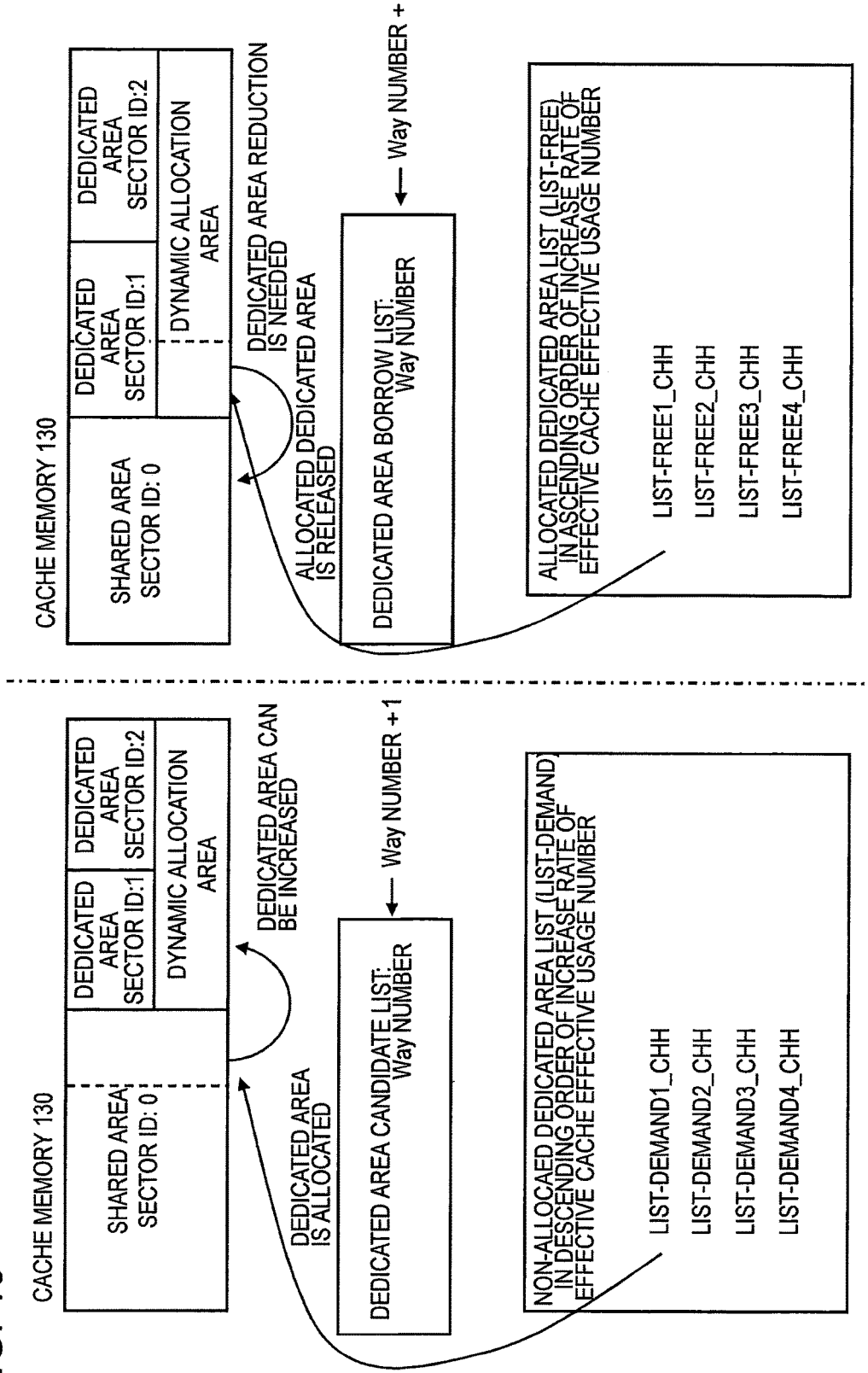
FIG. 19 illustrates the third example of the regular allocation review processing S18.

FIG. 18 is a flowchart diagram of the third example of the regular allocation review processing S18. FIG. 19 illustrates the third example of the regular allocation review processing S18. In the third example of the regular allocation review processing S18, where a deviation occurs between an ideal size of the shared cache area based on a real weighted memory access ratio and the real size of the shared cache area, the replacement processing is performed to allocate the shared cache area as a dedicated cache area to the non-allocated dedicated area acquisition request, or to release the allocated dedicated cache area and allocate it to the shared cache area, so as to bring the shared cache area closer to the ideal size ratio.

In the cache memory 130 depicted on the left and right side in FIG. 19, the solid line represents the actual size ratio, and the broken line represents the ideal size ratio. In the cache memory 130 on the left side, the shared cache area is larger than the ideal size. Therefore, it is desirable to allocate the difference of the shared area as a dedicated area to the non-allocated dedicated area acquisition request. Conversely, in the cache memory 130 on the right side, the shared cache area is less than the ideal size. Therefore, it is preferred to release the difference of the allocated dedicated area and change the dedicated area into the shared area.

The ideal size of the shared cache area is determined by Equations (13) and (14) below.

$$MACCESSXn = \Sigma(m=1\sim n)MACCESSm * PRIORITYm \qquad (13)$$

$$RSIZE_{SHR} = CEIL\{(MACCESSX_{SHR}/MACCESSX_{ALL}) * SIZE_{ALL}\} \qquad (14)$$

Here, MACCESSXn is a total value of weighted memory access amounts of n object processing operations, MACCESSm is the memory access amount of the object processing m, and PRIORITYm is the priority of the processing m. Further, $RSIZE_{SHR}$ is the ideal size of the shared cache area (SHR), and $MACCESSX_{SHR}$, $MACCESS_{ALL}$, and $SIZE_{ALL}$ indicate the access amount to the shared cache area (SHR), the access amount to the entire cache area (ALL), and the size of the entire cache area. (ALL) CEIL means rounding up.

Therefore, since the total value of weighted memory access amounts MACCESSXn of n object processing operations can be determined from Equation (13), the weighted memory access amounts of the entire object processing using the shared cache area can be calculated with Equation (13). Likewise, the weighted memory access amount of the entire object processing using the entire dedicated cache area or the entire cache area can be similarly calculated with Equation (13).

Further, in Equation (14), the ideal size $RSIZE_{SHR}$ of the shared cache area is determined by dividing the size of the entire cache area ($SIZE_{ALL}$) into the shared area and dedicated area in proportion to the weighted memory access amount ($MACCESSX_{SHR}/MACCESSX_{ALL}$). Therefore, the ideal size $RSIZE_{SHR}$ of the shared cache area is determined on the basis of the ratio of the weighted memory access numbers of the shared area and dedicated area.

Further, the abovementioned ideal size of the shared cache area and the real size are then compared, and it is determined whether or not the difference therebetween is greater than the overhead value OVH1 needed for the replacement. This determination is performed on the basis of whether or not the following Equation (15) is fulfilled.

$$ABS\{MACCESSX_{SHR} - MACCESSX_{ALL} * (SIZE_{SHR}/SIZE_{ALL})\} > OVH1 \qquad (15)$$

Here, ABS is an absolute value.

Equation (15) is a conditional equation for the case in which the difference between a first weighted access frequency $MACCESSX_{SHR}$, which is obtained by weighting, with the priority of the object processing, the memory access frequency in the object processing allocated to the shared cache area during process execution, and a second weighted access frequency $MACCESSX_{ALL} * (SIZE_{SHR}/SIZE_{ALL})$ of the shared cache area obtained by proportional division of the cumulative value $MACCESSX_{ALL}$ of the weighted access frequency, which is obtained by weighting the memory access frequency of each object processing by the priority of each object processing, by the size ratio ($SIZE_{SHR}/SIZE_{ALL}$) of the shared cache area and the dedicated cache area is higher than the overhead value OVH1. Where this conditional equation is fulfilled, the allocated dedicated cache area is replaced with the shared cache area, or the shared cache area is replaced with the non-allocated dedicated cache area, for the size corresponding to this difference.

Where the entire Equation (15) is multiplied by $SIZE_{ALL}/MACCESSX_{ALL}$, the following Equation (16) is obtained.

$$ABS\{(MACCESSX_{SHR}/MACCESSX_{ALL}) * SIZE_{ALL} - SIZE_{SHR}\} > OVH1 * (SIZE_{ALL}/MACCESSX_{ALL}) \qquad (16)$$

$$ABS\{(RSIZE_{SHR} - SIZE_{SHR})\} > OVH1 * (SIZE_{ALL}/MACCESSX_{ALL}) \qquad (16)$$

Thus, this is the same as determining whether or not the difference between the ideal size $RSIZE_{SHR}$ of the shared cache area, which is determined by the real weighted access frequency ratio, and the real size $SIZE_{SHR}$ exceeds the overhead value.

Accordingly, where Equation (15) or (16) above is fulfilled, the allocated dedicated cache area is replaced with the shared cache area, or, conversely, the shared cache area is replaced with the non-allocated dedicated cache area, so as to bring the size of the shared cache area close to the ideal size.

Therefore, in the present embodiment, when the real size is larger than the ideal size of the shared area, as depicted on the left side in FIG. 19, the size (WAY number) of the dedicated area candidate list is increased, and the possibility of allocating a dedicated area with respect to the non-allocated dedicated area request is recorded in the regular reviewing. Conversely, where the real size is less than the ideal size of the shared area, the size (WAY number), as depicted on the right side in FIG. 19, of the dedicated area borrow list is increased, and the possibility of allocating the allocated dedicated area to the shared area is recorded in the regular reviewing.

Further, in the regular reviewing, as depicted on the left side in FIG. 19, the dedicated areas are allocated from the head of the non-allocated dedicated area list LIST-DEMAND by the size (WAY number) of the dedicated area candidate list. Alternatively, as depicted on the right side in FIG. 19, the dedicated areas are released from the head of the allocated dedicated area list LIST-FREE by the size (WAY number) of the dedicated area borrow list.

Explaining again according to the flowchart in FIG. 18, the cache allocation management unit 204 determines the necessity of substituting the shared area and dedicated area on the basis of the difference between the ideal size and real size of the shared area (S70). More specifically, where the size of the dedicated area candidate list is positive (S71), the dedicated area is allocated to the non-allocated dedicated area acquisition request (S72). Meanwhile, where the size of the dedicated area borrow list is positive (S73), the allocated dedicated area is released (S74).

Where the difference between the ideal size and real size of the shared area does not exceed the overhead value, the cache allocation management unit 204 executes the regular allocation review processing (1), (2) explained with reference to FIGS. 14 and 16 (S75).

In the third example, it is desirable that the allocation be performed by the cache size (Way number) recorded in the dedicated area candidate list.

[Replacement Processing of Sector ID Conversion Table During Process Switching]

Figure 25:
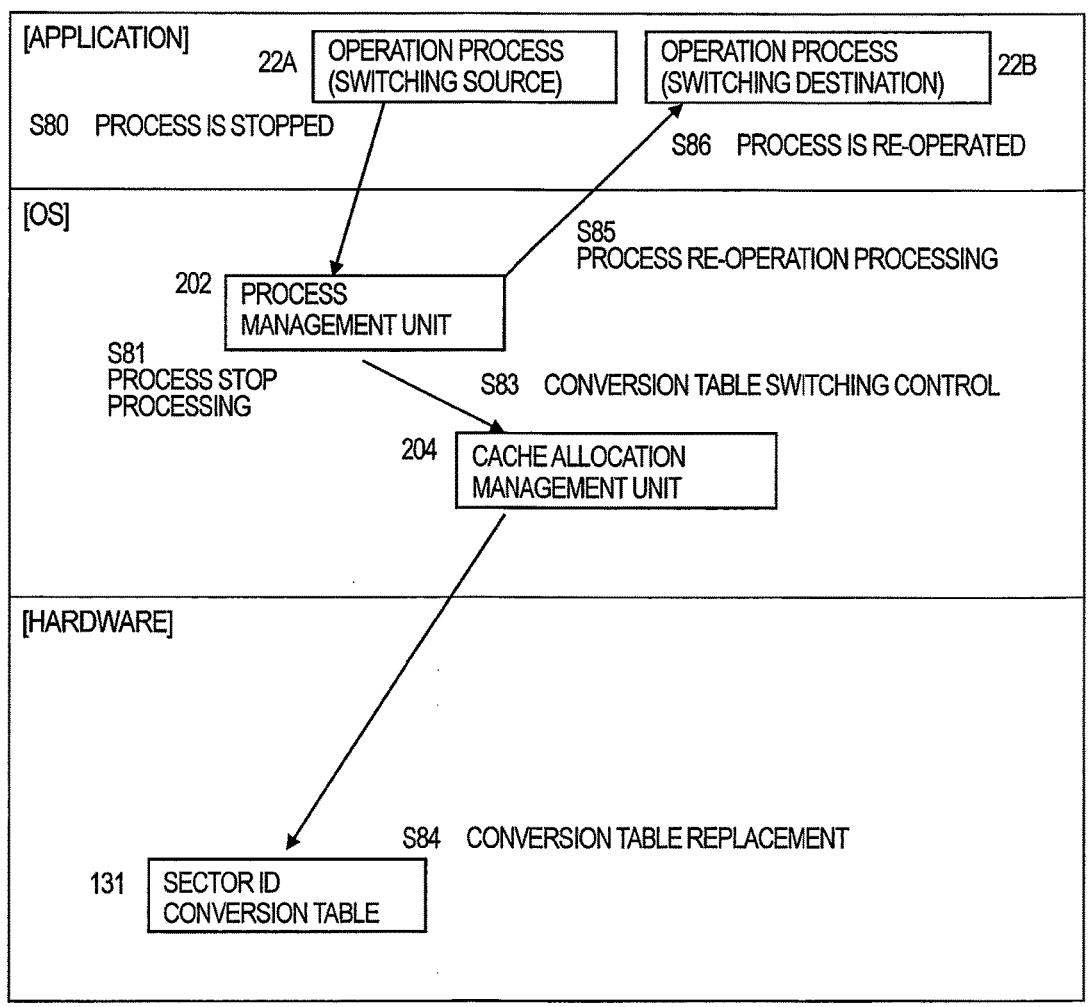
FIG. 25 depicts the replacement processing of the sector ID conversion table when the process 22 of the application program is switched.

FIG. 25 depicts the replacement processing of the sector ID conversion table when the process 22 of the application program is switched. When an operation process 22A of a switching source stops a process, the management unit 202 in the OS performs the stopping processing of this process (S81). At the same time, the process management unit instructs (S83) the cache allocation management unit 204 to perform the switching control of the sector ID switching table and replaces the sector ID conversion table of the operation process 22A of the switching source with the sector ID conversion table of an operation process 22B of a switching destination (S84). Then, the process management unit 202 starts the process operation of the operation process 22B of the switching destination (S86).

Thus, where the process is switched, the process management unit 202 causes the cache allocation management unit 204 to replace the sector ID conversion table, and the process of the switching destination performs the memory access on the basis of the cache memory division state of this sector ID conversion table.

In the first embodiment, in the determination (1) relating to the dedicated area acquisition request depicted in FIG. 8, where the priority-added effective cache usage degree of the object processing of the dedicated area acquisition request exceeds the second reference value, the dedicated area is allocated. In this determination, the presence/absence of the allocation of the dedicated area may be also determined by using, as an indicator, the effective cache usage degree that has not been multiplied by the priority in Equations (4) and (7).

In the first embodiment, in the determination (2) relating to the dedicated area acquisition request depicted in FIGS. 10-13, whether or not to allocate a dedicated area with respect to the dedicated area acquisition request is determined by using the increase rate of the priority-added effective cache usage number as the determination indicator. In this determination, whether the allocation of the dedicated area is performed or not may be also determined by using, as an indicator, the increase rate of the priority-added effective cache usage number that has not been multiplied by the priority in Equations (8) and (9).

In the first embodiment, the determination using indicators that does not take the priority into consideration may be also similarly performed in the regular allocation reviews (1), (2), and (3).

Second Embodiment

The second embodiment relates to dynamic allocation of cache memory in the case in which interruption—exceptional processing has occurred during the usual process operation of the application program. The interruption—exceptional processing is processing or program with a high priority. Examples of internal CPU interruption includes a program interruption caused by numerical overflow and a supervisor interruption such as an input/output processing request. Examples of external CPU interruptions include an input/output interruption such as a completion notification of an input/output request, a timer interruption such as a timer-driven interruption, and a console interruption such as an console operation-caused interruption.

Where such interruption—exceptional processing occurs, the OS interrupts the operating program or processing and executes the OS interruption processing available in the OS. The OS interruption processing executes memory access to an address entirely different from the address of the memory access executed by the preceding operating program or processing. Therefore, data in the shared cache area of the program or processing that has heretofore been operating are mostly evicted as a result of memory access by the OS interruption processing. In other words, the OS interruption processing is processing with a large disturbance force that disturbs data in the shared cache area.

Accordingly, in the second embodiment, an interruption—exceptional processing dedicated area acquisition request to which a special local sector ID has been allocated and a dedicated area release request are inserted into the OS interruption processing included in the OS 20, and this special local sector ID is allocated to the commands in the OS interruption processing. As a result, as has been explained in the first embodiment, a dedicated cache area for disturbance processing is allocated to the OS interruption processing, and the memory access in the OS interruption processing is executed using the dedicated cache area for the disturbance processing.

Figure 27:
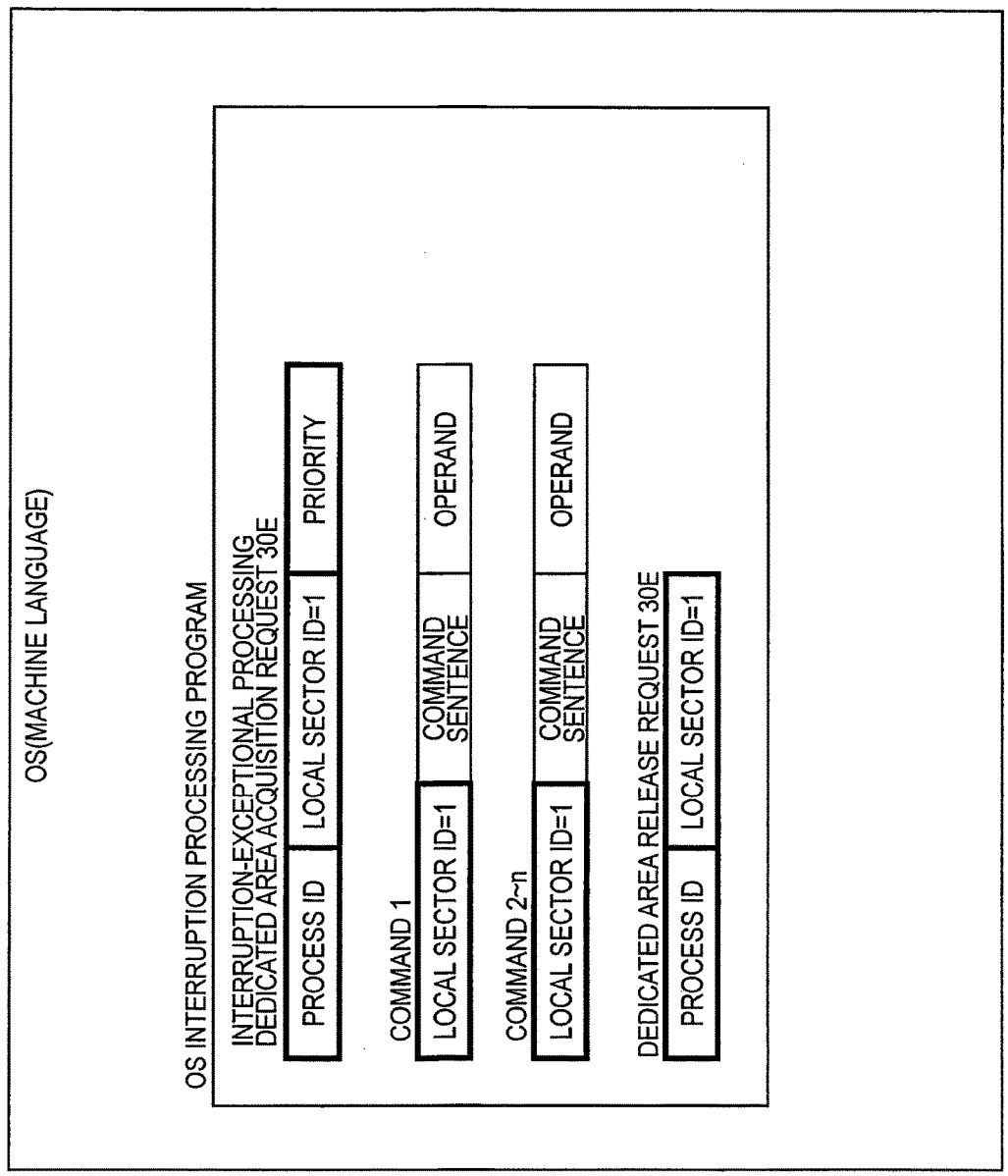
FIG. 27 depicts the configuration example of the OS interruption processing program (OS interruption processing process 203) in the second embodiment.

FIG. 27 depicts the configuration example of the OS interruption processing program (OS interruption processing process 203) in the second embodiment. In the OS design, an interruption—exceptional processing dedicated area acquisition request 30E and a dedicated area release request 34E thereof are inserted in the OS interruption processing program. The process ID of the object process and a special local sector ID=1 are set in the interruption—exceptional processing dedicated area acquisition request 30E and the dedicated area release request 34E. Further, the special local sector ID 1 is also set in the commands in the OS interruption processing program.

In the second embodiment, the interruption-exceptional processing is also generated under the development environment, and the characteristic examination thereof is performed. According to the examination processing, the interruption—exceptional processing has a high cache mishit rate and a high disturbance force represented by Equation (5) above.

Figure 26:
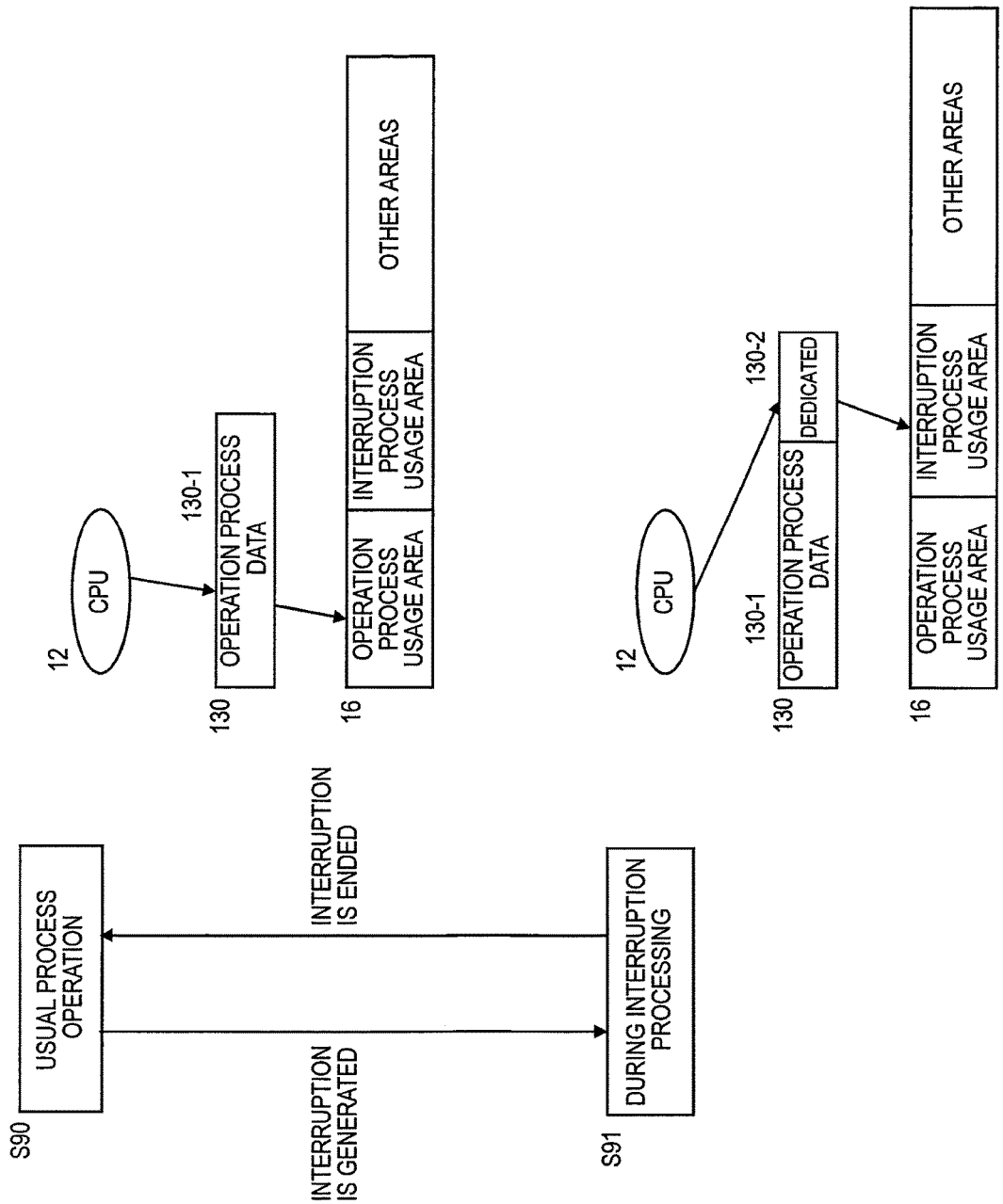
FIG. 26 illustrates the memory access in the second embodiment.

FIG. 26 illustrates the memory access in the second embodiment. FIG. 26 depicts the memory access with the CPU 12 in the usual process operation (S90), and also the dynamic allocation state and memory access of the cache memory during the interruption processing (S91).

In S90 during the usual process operation, the CPU 12 executes the memory access by using a shared cache area 130-1 in the cache memory 130. Therefore, some data in the operation process usage area in the main memory 16 are written in the shared cache area 130-1.

Meanwhile, where the interruption-exceptional processing is generated, the interruption-exceptional dedicated area acquisition request 30E in the OS interruption processing process depicted in FIG. 26 is issued, and the cache allocation management unit 204 determines that the disturbance force is high on the basis of the characteristic examination result, as indicated in the flowchart in FIG. 8, and allocates the dedicated cache area 130-2 for the disturbance processing in the cache memory 130. Because of such allocation, a cache sector ID of the allocated dedicated cache area is linked with the local sector ID=1 in the sector ID conversion table. As a result, the command in the OS interruption processing process depicted in FIG. 26 uses the dedicated cache area 130-2 and executes the memory access on the basis of the local sector ID=1. As a consequence, the eviction of the operation process data, which are located in the shared cache area 130-1 of the cache memory 130, by the cache mishit caused by the OS interruption processing can be avoided.

Figure 28:
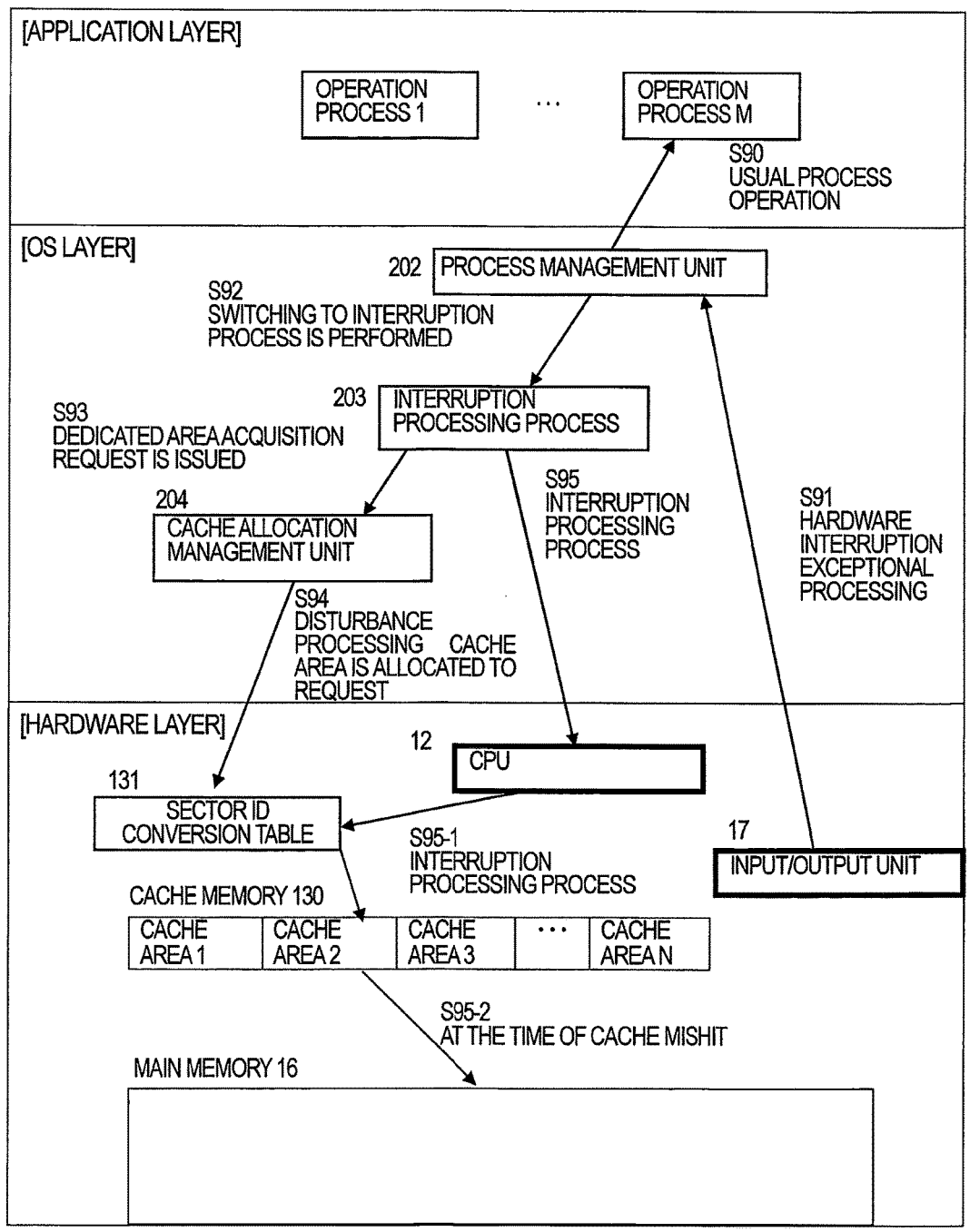
FIG. 28 depicts the processing performed when the interruption-exceptional processing is generated in the second embodiment.
Figure 29:
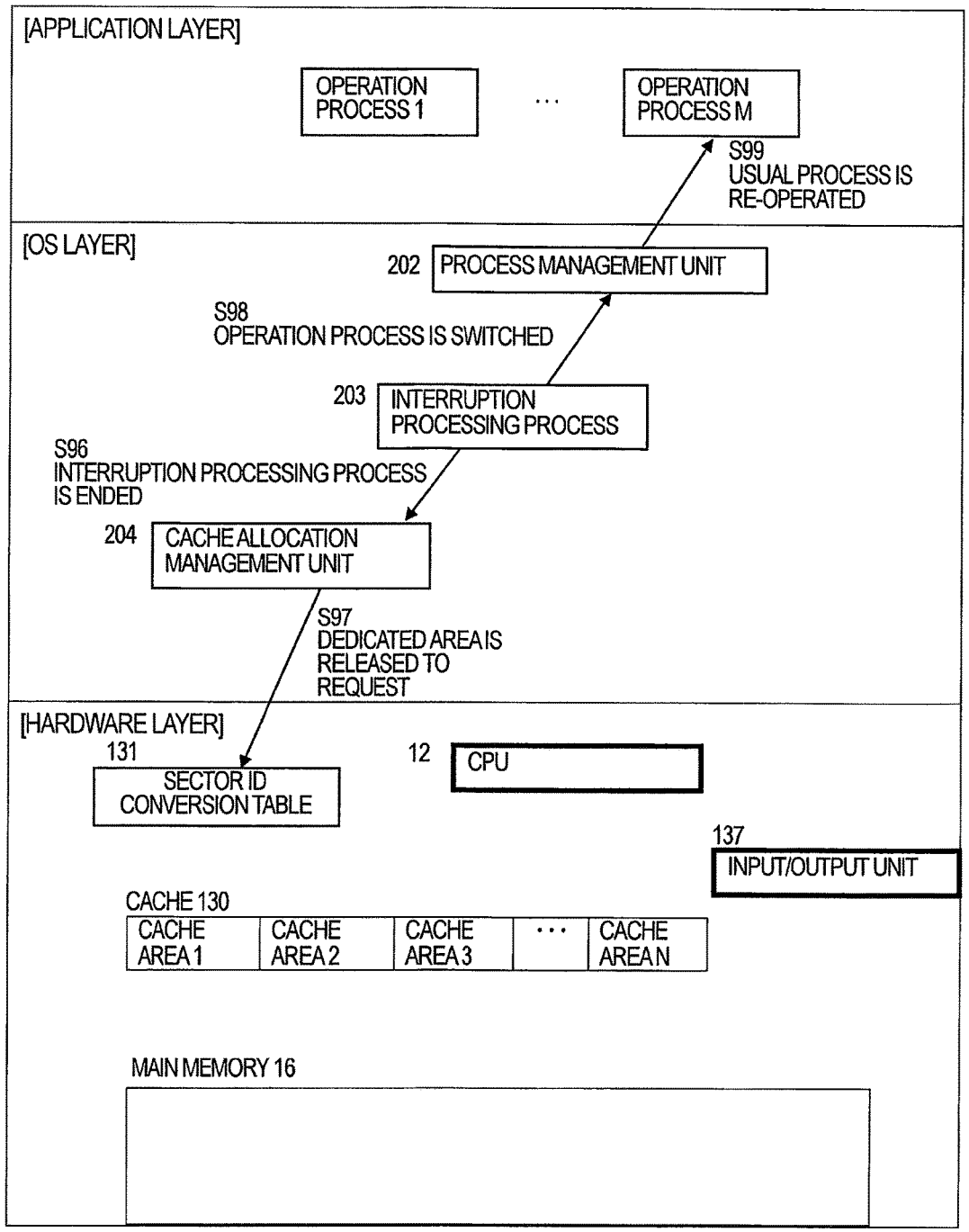
FIG. 29 depicts the processing performed when the interruption-exceptional processing is generated in the second embodiment.
Figure 30:
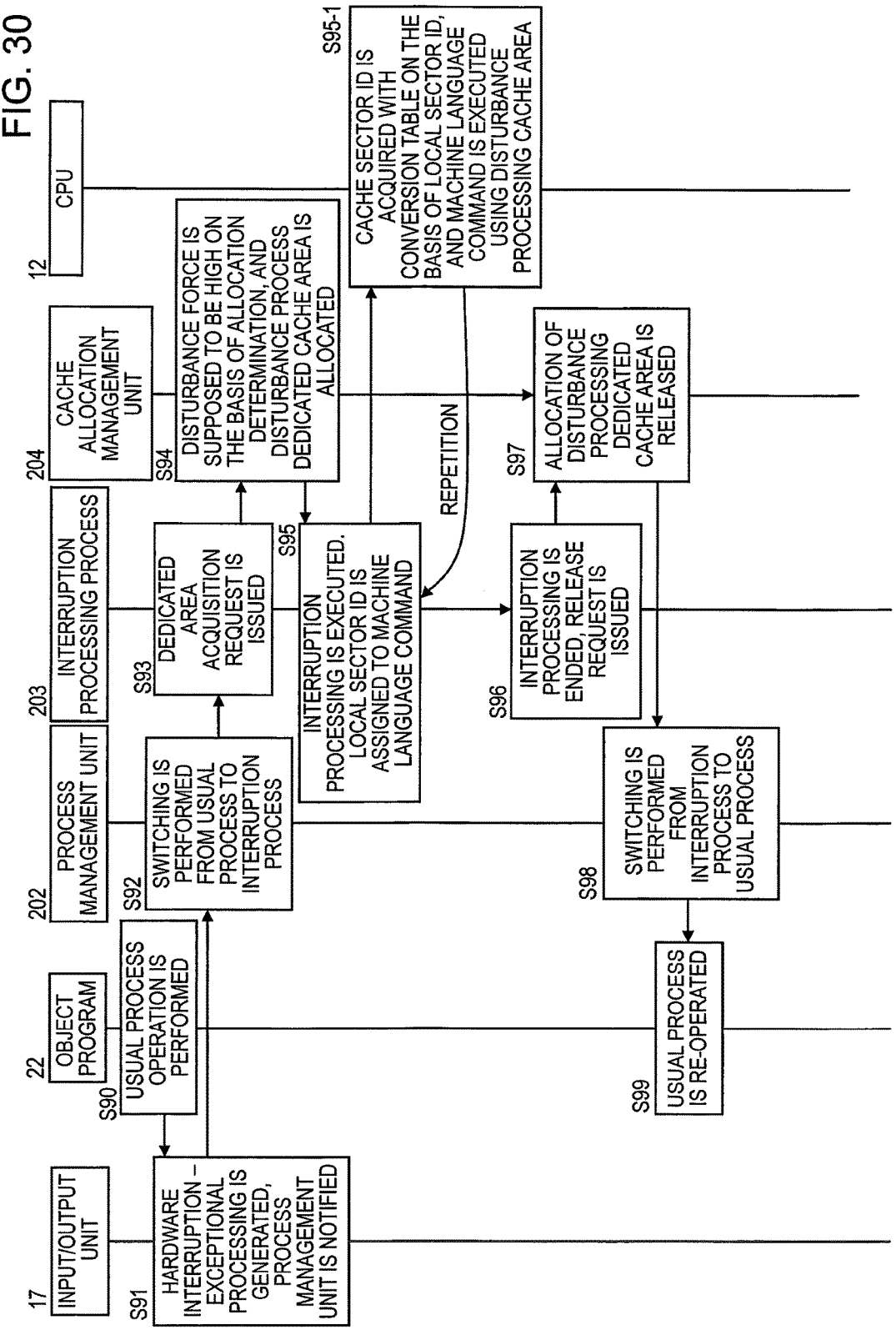
FIG. 30 is a flowchart of the processing performed when the interruption-exceptional processing is generated in the second embodiment.

FIGS. 28 and 29 depict the processing performed when the interruption-exceptional processing is generated in the second embodiment. FIG. 30 is a flowchart of the processing performed when the interruption-exceptional processing is generated in the second embodiment. The processing performed when the interruption-exceptional processing is generated will be explained below with reference to those drawings.

During the usual process operation, the process management unit 202 in the OS 20 manages the operation of the usual process (S90). Further, the hardware interruption-exceptional processing is generated, for example, from the input/output unit 17 (S91). The process management unit 202 is notified of this interruption-exceptional processing. In response to this notification, the process management unit 202 executes the processing of switching to the interruption processing (S92).

Thus, the interruption processing process 203 in the OS issues the dedicated area acquisition request 30E of the interruption-exceptional processing that has been inserted into the interruption processing process (S93). In response to this request, the cache allocation management unit 204 determines whether the allocation of a dedicated area is present (S94). In this determination, the cache allocation management unit 204 detects that the corresponding processing has a high cache disturbance force, and allocates a dedicated cache area for the disturbance processing (S94). More specifically, the cache allocation management unit 204 links the cache sector ID of the allocated dedicated cache with the local sector ID=1 in the sector ID conversion table 131 of the OS interruption processing process, and also sets the size of the dedicated cache area in the cache sector setting unit 132.

Then, the interruption processing process 203 issues a machine language command of the OS interruption processing and causes the CPU 12 to execute the command (S95). Since the local sector ID=1 has been set in the machine language command of the OS interruption processing, the CPU 12 acquires the cache sector ID of the dedicated cache area for the disturbance processing via the sector ID conversion table 131 and executes the memory access by using the dedicated cache area 130-2 for the disturbance processing with this cache sector ID (S95-1). Where a cache mishit is generated in the memory access, the access to the main memory 16 is executed (S95-2). As a result, the data in the shared cache area 130-1 of the process that has been heretofore in the operation are prevented from being affected by the memory access of the OS interruption processing and prevented from being evicted from the cache memory.

Where the OS interruption processing is completed, the interruption processing process 203 issues an OS interruption processing dedicated area release request 34E (S96). In response to this request, the cache allocation management unit 204 rewrites the cache sector ID, which is linked with the local sector ID=1 of the sector ID conversion table 131, as ID=0 (shared cache area) and releases the dedicated cache area for disturbance processing (S97). Then, the process management unit 202 executes switching to the original operation process and performs the re-operation of the process that has been operated (S99).

As indicated hereinabove, with the second embodiment, when the interruption-exceptional processing is generated, it is estimated that the cache disturbance force is high according to the flowchart depicted in FIG. 8, the dedicated cache area for disturbance processing is allocated, and the data of the process that has been operated before the interruption are prevented from being evicted from the shared cache area.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory processor-readable storage medium storing a cache memory control program which causes a processor to execute a procedure, comprising:

cache area allocating including allocating, in response to an acquisition request which is issued during execution of a process by the processor and requests an allocation of a dedicated cache area in a cache memory, and according to an effective cache usage degree that is based on a memory access frequency and a difference between a cache hit rate in a case where the dedicated cache area is allocated and a cache hit rate in a case where a shared cache area in the cache memory is allocated with respect to object processing, which is an object for the acquisition request, the dedicated cache area for a higher effective cache usage degree and the shared cache area for a lower effective cache usage degree; and releasing the dedicated cache area which is allocated, in response to a release request which is issued during execution of a process by the processor and requests the release of the allocated dedicated cache area, and wherein a memory access command that is issued during the object processing to which the dedicated cache area is allocated is executed by the processor by using the dedicated cache area which is allocated.

2. The non-transitory processor-readable storage medium according to claim 1, wherein the effective cache usage degree is a value obtained by multiplying the memory access frequency by the difference between the cache hit rate in the case where the dedicated cache area is allocated and the cache hit rate in the case where the shared cache area is allocated, and dividing the product by a size of the dedicated cache area which is to be used.

3. The non-transitory processor-readable storage medium according to claim 2, wherein in the cache area allocating, the dedicated cache area or the shared cache area is allocated according to a priority-added effective cache usage degree instead of the effective cache usage degree, the priority-added effective cache usage degree being obtained by further multiplying the effective cache usage degree by a priority of the object processing.

4. The non-transitory processor-readable storage medium according to claim 1, wherein the cache hit rate in a case where the dedicated cache area is allocated is included in a characteristic data on a cache hit rate versus a dedicated cache area size that is acquired in advance when the processor is caused to execute the object processing while changing the size of the dedicated cache area which is to be allocated.

5. The non-transitory processor-readable storage medium according to claim 1, wherein the cache hit rate in a case where the shared cache area is allocated includes a cache hit rate of the shared cache area during the execution of the object processing for which the acquisition request was issued.

6. The non-transitory processor-readable storage medium according to claim 1, wherein the cache area allocating includes, in response to the acquisition request, when a cache disturbance force, which is obtained by multiplying the memory access frequency by a cache miss rate relating to the object processing which is the object for the acquisition request, is higher than a reference value, allocating a disturbance processing cache area, which is different from the shared cache area and the dedicated cache area.

7. The non-transitory processor-readable storage medium according to claim 6, wherein the cache area allocating includes allocating the disturbance processing cache area commonly to a plurality of the acquisition requests.

8. The non-transitory processor-readable storage medium according to claim 1, wherein the cache area allocating includes updating an allocation information table having allocation information on the dedicated cache area and the shared cache area relating to the object processing following the allocating the dedicated cache area or the allocation of the shared cache area, and the procedure further includes switching, when the process is changed, an allocation information table of the process before the change to an allocation information table of the process after the change.

9. The non-transitory processor-readable storage medium according to claim 1, wherein the cache area allocating including comparing the effective cache usage degree of an issued acquisition request, which is newly issued with the effective cache usage degree of an allocated acquisition request to which the dedicated cache area is already allocated, and when the effective cache usage degree of the newly issued acquisition request is higher, releasing the dedicated cache area that is already allocated to the allocated acquisition request and allocating the shared cache area to the allocated acquisition request, and allocating the dedicated cache area to the newly issued acquisition request.

10. The non-transitory processor-readable storage medium according to claim 1, wherein the cache area allocating including comparing an effective cache usage number obtained by multiplying the effective cache usage degree of an issued acquisition request, which has been newly issued, by a dedicated cache area size with a cumulative increase number obtained by accumulation of increase rates of another effective cache usage number, which is obtained by multiplying the memory access frequency by an increase rate which is an increase number of a cache hit rate with respect to an increase in a unit area of an allocated acquisition request to which the dedicated cache area is already allocated, the accumulation being performed by the dedicated cache area size of the issued acquisition request, and where the effective cache usage number of the newly issued acquisition request is greater than the cumulative increase number, releasing the dedicated cache area that is already allocated to the allocated acquisition request and allocating the shared cache area to the allocated acquisition request, and allocating the dedicated cache area to the newly issued acquisition request.

11. The non-transitory processor-readable storage medium according to claim 10, wherein the procedure further includes:

list creating including examining, during the process execution, a cache hit rate and an access frequency of the allocated dedicated cache area with respect to object processing which is an object of the allocated acquisition request, and creating an allocated dedicated area list having a list of the increase rate of the effective cache usage number, and in the cache area allocating, the cumulative increase number is calculated by accumulation in ascending order of the increase rate of the effective cache usage number in the allocated dedicated area list.

12. The non-transitory processor-readable storage medium according to claim 1, wherein the procedure further includes:

list creating including examining, during the process execution, a cache hit rate and an access frequency of the allocated dedicated cache area with respect to object processing which is an object of the allocated acquisition request, to which the dedicated cache area is already allocated, and creating an allocated dedicated area list having a list of an increase rate of an effective cache usage number which is obtained by multiplying the memory access frequency by an increase rate which is an increase number of a cache hit rate with respect to an increase in a unit area of the allocated acquisition request, and a non-allocated dedicated area list having a list of an increase rate of the effective cache usage number of a non-allocated acquisition request to which the dedicated cache area is not yet allocated; and regular dedicated area replacement processing, which is regularly executed during the process execution and in which, where a maximum value of the non-allocated dedicated area list is greater than a minimum value of the allocated dedicated area list by a value equal to or greater than an overhead value required for replacement processing, including releasing an allocated dedicated cache area with respect to the corresponding allocated acquisition request and allocating the shared cache area to the allocated acquisition request, and allocating the dedicated cache area to the corresponding non-allocated acquisition request.

13. The non-transitory processor-readable storage medium according to claim 12, wherein in the regular dedicated area replacement processing, while increasing a dedicated cache area size of a maximum value of the non-allocated dedicated area list, it is determined whether an increase rate of an effective cache usage number of the maximum value of the non-allocated dedicated area list is greater, by a value equal to or greater than an overhead value, than a cumulative value of an increase rate of an effective cache usage number of an allocated dedicated area in the order from a minimum value of the allocated dedicated area list up to a list number corresponding to the increasing dedicated cache area size, and when the determination is true, the dedicated cache area with a maximum size of the increasing dedicated cache area size is allocated to a non-allocated acquisition request corresponding to the maximum value of the non-allocated dedicated area list, the allocated dedicated cache areas up to the list number of the allocated dedicated area list are released, and the shared cache area is allocated.

14. The non-transitory processor-readable storage medium according to claim 1, wherein the procedure further includes a regular dedicated area replacement processing that is regularly executed during the process execution, and the regular dedicated area replacement processing including, when a difference between an ideal size of a shared cache area based on a memory access ratio, which is a ratio of a memory access number to the shared cache area and a memory access number to all cache area, and a real size of the shared cache area is higher than an overhead value, allocating the shared cache area as a dedicated cache area to a non-allocated acquisition request to which a dedicated area is not yet allocated, or releasing an allocated dedicated cache area that is already allocated to an allocated acquisition request to which a dedicated area is already allocated, so that the shared cache area comes close to the ideal size.

15. The non-transitory processor-readable storage medium according to claim 14, wherein the procedure further includes list creating including examining, during the process execution, a cache hit rate and an access frequency of the allocated dedicated cache area with respect to object processing which is an object of the allocated acquisition request and creating an allocated dedicated area list having a list of an increase rate of a effective cache usage number which is obtained by multiplying the memory access frequency by an increase rate which is an increase number of a cache hit rate with respect to an increase in a unit area of the allocated acquisition request, and a non-allocated dedicated area list having a list of an increase rate of the effective cache usage number of the non-allocated acquisition request, and in the regular dedicated area replacement processing, the allocated dedicated cache area is released and the shared cache area is allocated in ascending order of the increase rate in the allocated dedicated area list according to a size of a dedicated area borrow list having a difference between the ideal size and the actual size of the shared cache area, and the dedicated cache area is allocated in descending order of the increase rate in the non-allocated dedicated area list according to a size of a dedicated area candidate list having a difference between the ideal size and the actual size of the shared cache area.

16. A non-transitory processor-readable storage medium storing a cache memory control program which causes a processor to execute a procedure comprising:

a cache area allocating including allocating, in response to an acquisition request which is issued during execution of a process by the processor and requests the allocation of a dedicated cache area in a cache memory, the dedicated cache area with cache data management separate from that of other cache areas, when a cache disturbance force obtained by multiplying a memory access frequency by a cache miss rate relating to object processing, which is an object for the acquisition request, is higher than a reference value;

releasing the dedicated cache area, which is allocated, in response to a release request which is issued during execution of a process by the processor and requests the release of the allocated dedicated cache area, and wherein a memory access command that is issued during the object processing to which the dedicated cache area is allocated is executed in the processor by using the dedicated cache area which is allocated.

17. A processor comprising:

a CPU that executes a command and performs memory access;

a cache memory that is referred to when the memory access is performed; and a cache memory controller that divides the cache memory into a shared cache area and a dedicated cache area and controls the divided cache areas, wherein the cache memory controller includes:

a cache area allocator that allocates, in response to an acquisition request which is issued during execution of a process by the CPU and requests an allocation of a dedicated cache area in a cache memory, and according to an effective cache usage degree that is based on a memory access frequency and a difference between a cache hit rate in a case where the dedicated cache area is allocated and a cache hit rate in a case where a shared cache area in the cache memory is allocated with respect to object processing, which is an object for the acquisition request, the dedicated cache area for a higher effective cache usage degree and the shared cache area for a lower effective cache usage degree; and that releases the dedicated cache area which is allocated, in response to a release request which is issued during execution of a process by the CPU and requests the release of the allocated dedicated cache area, and wherein a memory access command that is issued during the object processing to which the dedicated cache area is allocated is executed using the dedicated cache area which is allocated.

18. A cache memory control method comprising:

cache area allocating including allocating, in response to an acquisition request which is issued during execution of a process by the processor and requests an allocation of a dedicated cache area in a cache memory, and according to an effective cache usage degree that is based on a memory access frequency and a difference between a cache hit rate in a case where the dedicated cache area is allocated and a cache hit rate in a case where a shared cache area in the cache memory is allocated with respect to object processing, which is an object for the acquisition request, the dedicated cache area for a higher effective cache usage degree and the shared cache area for a lower effective cache usage degree; and releasing the dedicated cache area which is allocated, in response to a release request which is issued during execution of a process by the processor and requests the release of the allocated dedicated cache area, and wherein a memory access command that is issued during the object processing to which the dedicated cache area is allocated is executed by the processor by using the dedicated cache area which is allocated.

* * * * *